United States Patent [19]
Sargent

[11] Patent Number: 6,142,500
[45] Date of Patent: Nov. 7, 2000

[54] ADJUSTABLE, WEIGHT DISTRIBUTING TRAILER HITCH APPARATUS WITH SPRING DAMPENING ASSEMBLY

[76] Inventor: Frank T. Sargent, 5433 Brandy Cir., Fort Myers, Fla. 33919

[21] Appl. No.: 09/109,740

[22] Filed: Jul. 2, 1998

Related U.S. Application Data

[60] Provisional application No. 60/051,515, Jul. 2, 1997.
[51] Int. Cl.[7] .................................................. B62D 53/00
[52] U.S. Cl. ..................................... 280/405.1; 280/406.2; 280/478.1; 280/490.1; 280/483; 280/511; 280/455.1
[58] Field of Search ............................. 280/405.1, 406.1, 280/406.2, 407, 477, 478.1, 490.1, 483, 484, 489, 498, 499, 511, 455.1

[56] References Cited

U.S. PATENT DOCUMENTS

| | | | |
|---|---|---|---|
| 2,438,032 | 3/1948 | Bready | 280/489 |
| 2,680,626 | 6/1954 | Hedgpeth | 280/406.2 |
| 2,710,760 | 6/1955 | Branstrator et al. | 280/406.2 |
| 2,772,893 | 12/1956 | Wettstein | 280/406.2 |
| 2,966,369 | 12/1960 | Paul, Jr. | 280/489 |
| 3,347,540 | 10/1967 | Sullivan | 267/1 |
| 3,575,241 | 4/1971 | McKeon | 172/3 |
| 3,588,145 | 6/1971 | Thompson | 280/489 |
| 3,910,354 | 10/1975 | Johnson et al. | 172/267 |
| 5,226,657 | 7/1993 | Dolphin | 280/498 |
| 5,725,231 | 3/1998 | Buie | 280/455.1 |

*Primary Examiner*—Daniel G. DePumpo
*Attorney, Agent, or Firm*—William E. Noonan

[57] ABSTRACT

A weight distributing hitch apparatus includes a drawbar assembly, which is interconnected to a tow vehicle and includes an elongate bar and a component that is pivotally interconnected and angularly adjustable relative to the bar. A hitch head assembly includes a ball component attached to a ball coupler on the trailer. A drawbar extension is suspended from the ball component and a height adjustment channel is pivotally interconnected to the drawbar extension. A horn is slidably received by the channel. The horn and the angularly adjustable drawbar component are selectively coupled to interconnect the trailer to the tow vehicle. A dual action, pre-loaded spring interconnects the trailer and the drawbar extension to provide improved dampening and bounce control.

16 Claims, 22 Drawing Sheets

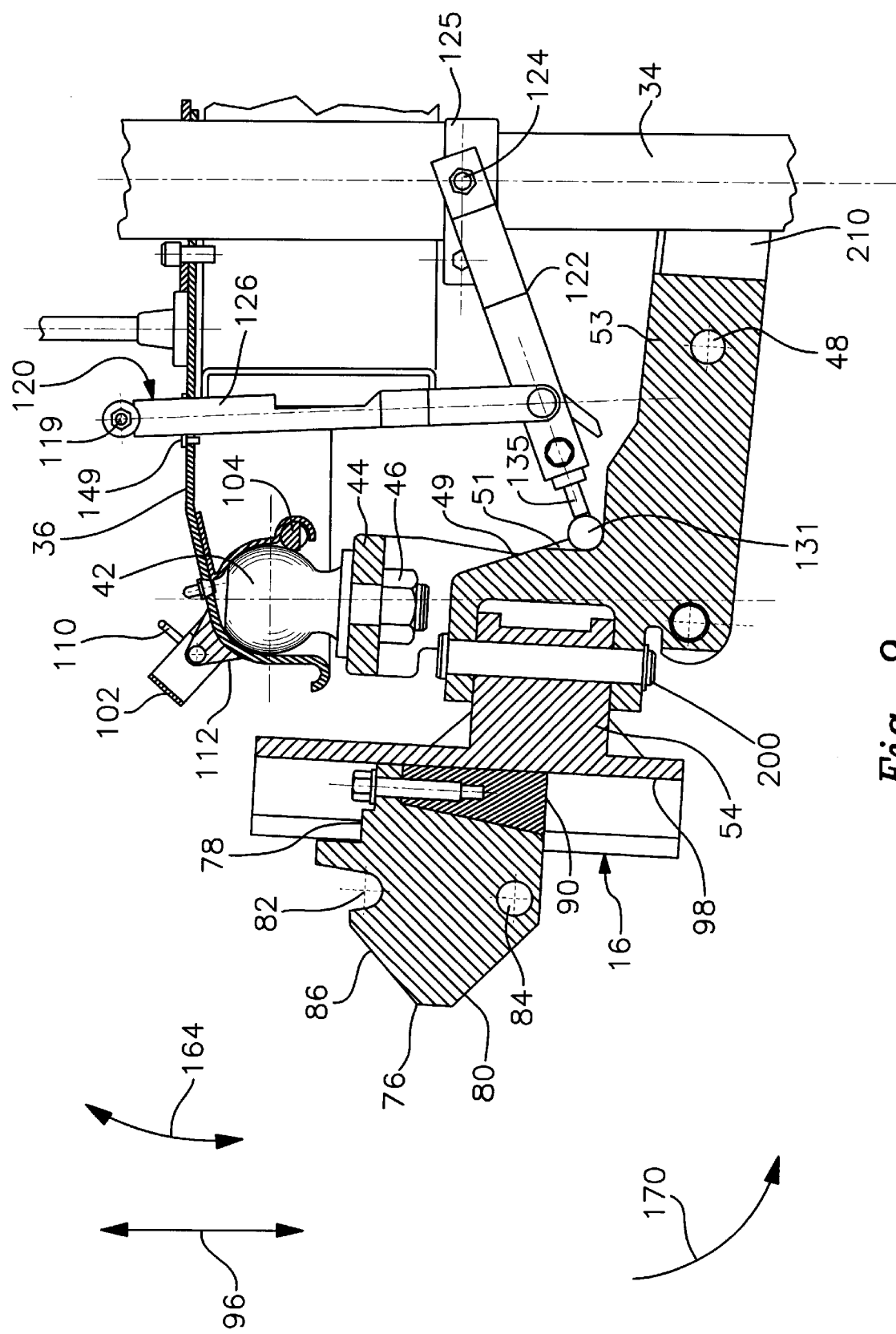

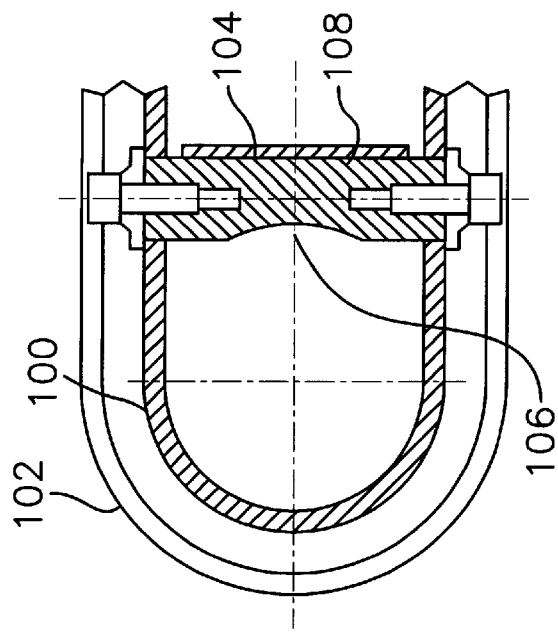
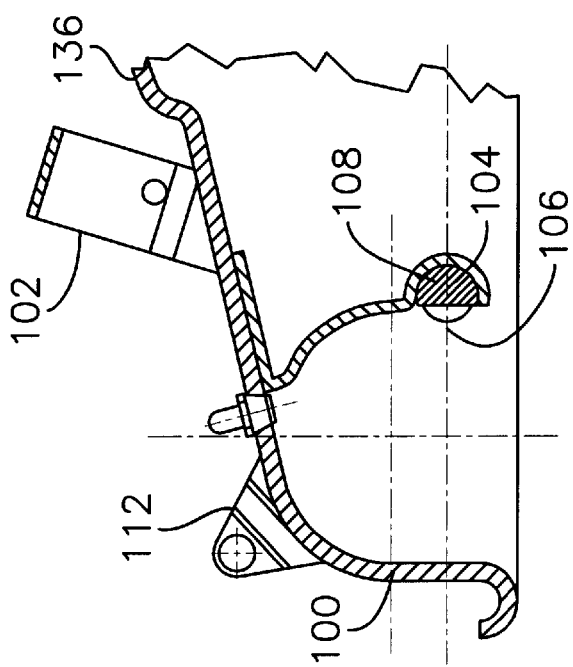
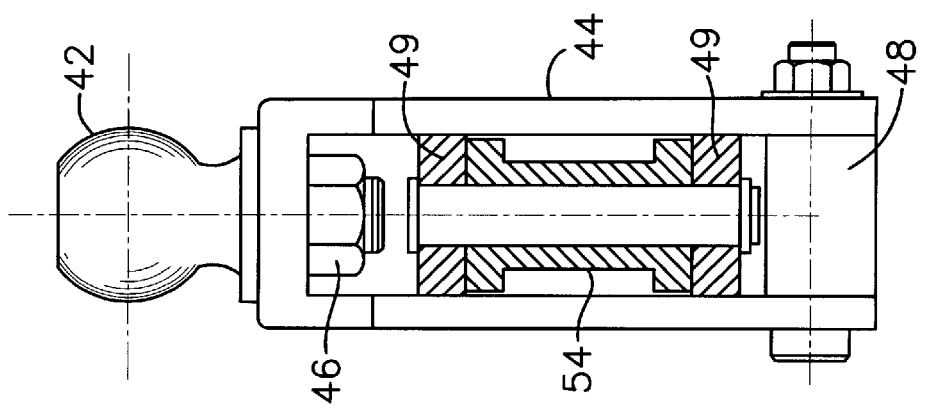

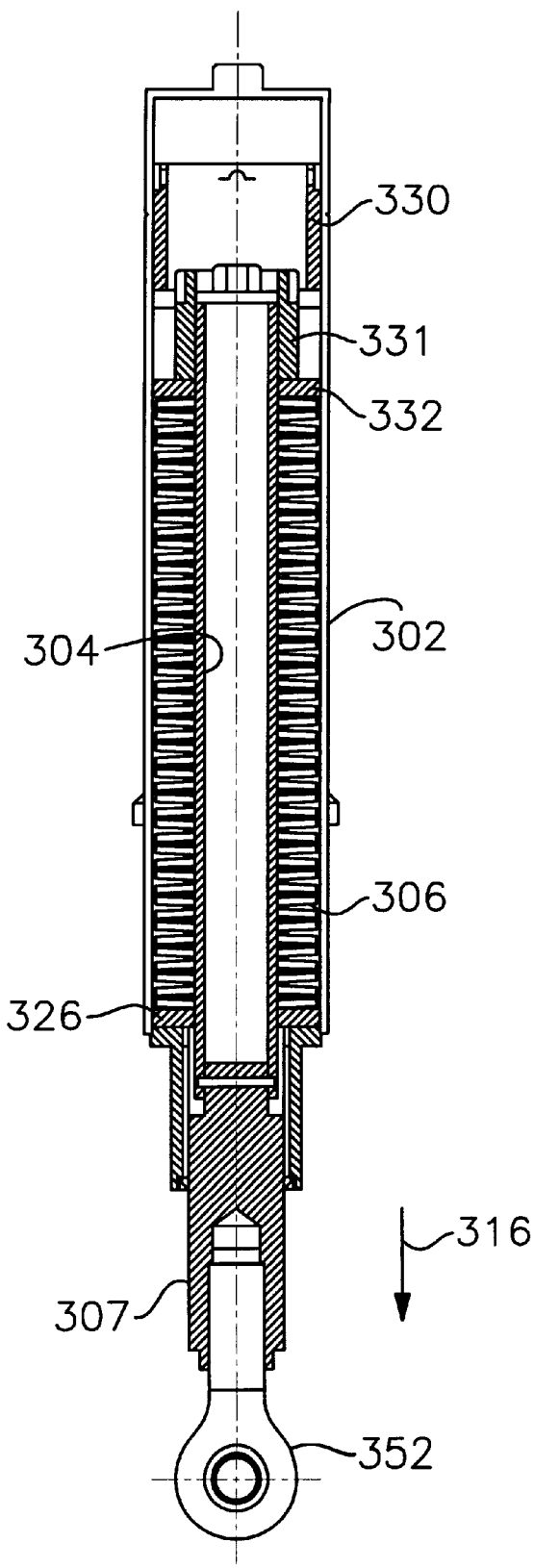
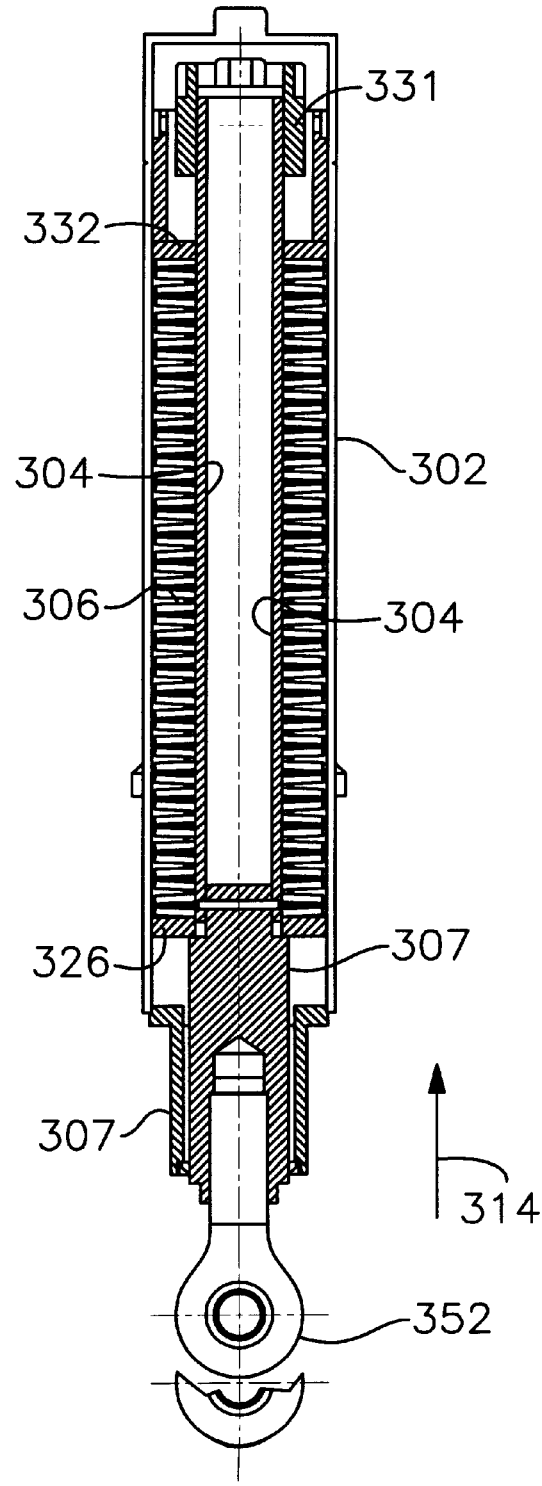
Fig. 18A
Fig. 18B

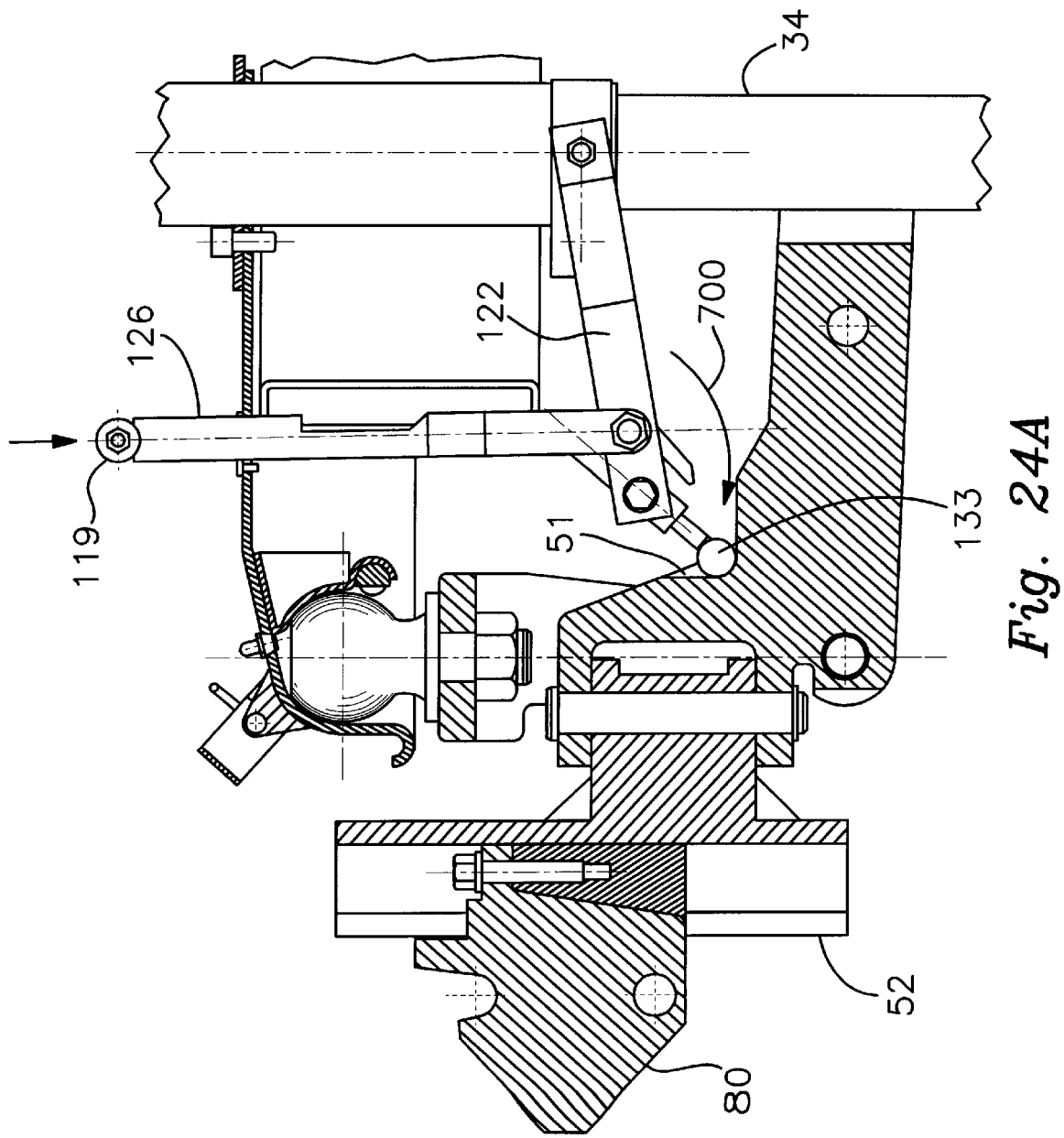

ADJUSTABLE, WEIGHT DISTRIBUTING TRAILER HITCH APPARATUS WITH SPRING DAMPENING ASSEMBLY

RELATED APPLICATION

This application is a continuation of U.S. patent application Ser. No. 60/051,515, filed Jul. 2, 1997.

FIELD OF THE INVENTION

This invention relates to an adjustable trailer hitch apparatus, and, more particularly, to a weight distributing trailer hitch apparatus featuring an adjustable coupling and a pre-loaded, dual action dampening assembly.

BACKGROUND OF THE INVENTION

Various hitch assemblies are available for connecting a trailer to a tow vehicle. When heavy trailers and large tongue weights are involved, levelizing or weight distributing hitches are normally utilized. These assemblies spread the tongue weight of the trailer among the axles of the tow vehicle and the trailer so that a stable ride is achieved.

Installing such hitches and coupling the trailer to the tow vehicle is almost invariably a complicated, laborious and time consuming procedure. The installation procedure requires a fairly high degree of skill to ensure that proper weight distribution and a stable ride are achieved. Ideally, the levelness of the tow vehicle's body, as measured at the front and rear of the vehicle, should vary in height before and after coupling by no more than ½". Otherwise, one of the axles may be overloaded, which can result in poor handling and present an increased risk of accident.

Conventionally, when a weight distributing trailer hitch is purchased, it must be installed by a skilled hitch specialist. After examining the tow vehicle and trailer involved, the installer assembles the hitch so that, based upon his experience, proper weight distribution is provided. Specifically, the installer welds the drawbar tongue or extension (which is an extension of the conventional drawbar receiver) onto the hitch head at a desired angle. Unfortunately, this technique is far from precise. If an incorrect angle is formed, the weld may have to be broken and reformed. In some cases, the incorrect angle is simply ignored. Such a hitch may contribute to potentially dangerous instability of the trailer and tow vehicle. Even in cases where the proper weight distributing angle is formed, problems may occur. Typically, the correct angle applies for only one particular type of tow vehicle. If a different vehicle is to be used, the weld again may have to be broken and reformed. This can be a tedious and fairly costly procedure that requires the expertise of a professional installer.

After the initial trailer hitch installation is performed, the trailer owner encounters difficulties and annoyances each time the trailer must be coupled to or uncoupled from the tow vehicle. The welded hitch head and drawbar extension must be removed from storage and carried to the trailer. This is normally a fairly heavy, cumbersome and dirty unit. It must be lifted and manipulated by the owner and interconnected between the tow vehicle and the trailer. The hitch head includes the ball, which must be greased by hand and attached to the ball coupler. The spring bars must also be removed from storage and greased by hand and hooked to the trailer. This procedure is typically time consuming, messy, arduous and hard work. Furthermore, the tow vehicle must be moved with precision to properly position the trailer ball under the ball receiver. A second person is usually required to check the accuracy of the tow vehicle movement, provide signals to the driver for accurate positioning of the hitch ball beneath the hitch ball coupler, and otherwise provide assistance. Loading the conventional spring bars is a particularly awkward and annoying task. The bars must be loaded by hand and some type of lever is almost always required.

In operation, conventional trailer hitches exhibit still other problems. Most notably, the spring bars are apt to unload when the trailer encounters a bump or dip in the road, such as at a railroad crossing. This can cause the trailer to bounce upwardly. Such bounces are dampened only by gravity. As a result, dangerous instability may be exhibited. Instability is compounded because most trailer hitches employ an x-axis coupling that is positioned above the centerlines of the tow vehicle and trailer axles. Stated differently, the conventional x-axis coupling is located above the axis that interconnects the centerlines of the forwardmost tow vehicle axle and the rearwardmost trailer axle. This produces an unstable toggle effect that is amplified as the tow vehicle and the trailer cross variations in the road surface. During the earliest moment of braking this is a serious problem because linear movement of the tow vehicle is transformed into angular momentum which rotates about the center of gravity of the tow vehicle thereby causing the rear of the tow vehicle to lift the drawbar upward. This upward toggle pushes the rear of the tow vehicle upwardly with even greater force and instability results.

In most, if not all known trailer hitches, the x, y and z axes intersect at a single point, that is the center of the hitch ball. The x-axis is horizontal to the line of travel and comprises the axis about which the assembly pivots or rotates when encountering dips or bumps in the road; the y-axis is in the line of travel and comprises the axis about which the rig pivots when one side of one of the vehicle's wheels encounters a curb; and the z-axis constitutes the axis about which the tow vehicle turns relative to the trailer.

I have determined that it is desirable to provide a hitch wherein the y and z axes do not intersect and the couplings that define these axes are separate and distinct.

SUMMARY OF INVENTION

It is therefore an object of the present invention to provide an improved trailer hitch that is quickly and conveniently installed and assembled to properly distribute the tongue weight of the trailer to the axles of the trailer and the tow vehicle and provide for maximum stability in towing.

It is a further object of this invention to provide an improved, pre-loaded dampening device for a trailer hitch that cushions and controls both upward and downward motion of the trailer caused by variations in the road surface.

It is a further object of this invention to provide a trailer hitch assembly wherein the hitch drawbar and hitch head are adjustably interconnected and not welded together.

It is a further object of this invention to provide a trailer hitch assembly that may be adapted for use with many types of tow vehicles and trailers; and which can be quickly and conveniently adjusted to provide proper weight distribution for such vehicles.

It is a further object of this invention to provide a trailer hitch apparatus that exhibits improved dampening and bounce control so that the tow vehicle and trailer react to dips, bumps and other road surface undulations in a safer and more stable manner.

It is a further object of this invention to provide a trailer hitch apparatus employing a pre-loaded dual action spring that effectively resists unloading and that counteracts upward and downward movement caused by vertical variations in the road surface.

It is a further object of this invention to provide a trailer hitch apparatus that improves tow vehicle and trailer stability by employing an x-axis coupling, which is located below the centerlines of the tow vehicle and trailer axles and which does not intersect the z-axis coupling.

It is a further object of this invention to provide a hitch that significantly reduces the need for heavy tongue weights and redistributes those lesser weights to the axles of the tow vehicle and trailer so that a safer, more stable ride is achieved and less stress is placed on the tow vehicle.

It is a further object of this invention to provide a hitch that greatly simplifies and facilitates hitching and unhitching a trailer to and from a tow vehicle.

It is a further object of this invention to provide a trailer hitch apparatus that significantly reduces the labor involved in handling and storage of heavy, cumbersome and messy hitch components and which allows the trailer owner to quickly and conveniently hitch and unhitch the trailer to and from the tow vehicle following initial installation of the apparatus.

This invention features an adjustable, weight distributing trailer hitch apparatus including drawbar assembly. The drawbar assembly includes an elongate bar that is selectively interengaged with a complementary receiver mounted on the tow vehicle. The drawbar assembly also includes a first, angularly adjustable coupling component that is pivotally interconnected to the distal end of the elongate bar. The first coupling component includes means for adjusting the angle between the bar component and the first coupling component. There is also a hitch head assembly, which includes a ball element that is releasably attachable to and is suspendable from a ball coupler mechanism carried by the trailer. A drawbar extension is connected to and extends rearwardly of the hitch head. Pivot means having a generally vertical axis interconnect a height adjustment channel to the drawbar extension. A second, height adjustable coupling component is slidably interengaged with the channel and selectively raised and lowered therein. The second coupling component includes means for interengaging complementary means in the first coupling component to couple the first and second coupling components. Means are provided for adjusting the position of the second coupling component in the height adjustment channel. Means are also provided for temporarily supporting the second coupling component at a predetermined angular alignment. The angle of the first coupling component relative to the elongate bar is adjusted according to predetermined parameters. Likewise, the height or position of the second coupling component in the channel is adjusted according to predetermined parameters. Finally, the angular orientation of the second coupling component is adjusted and the first and second coupling components are interengaged and coupled. A dampening spring assembly is interconnected between a distal rearward end portion of the drawbar extension a nd the trailer frame. The spring assembly includes a preloaded, dual action spring that resiliently dampens movement of the drawbar extension upwardly and downwardly relative to the trailer. Also, the spring assembly is pre-loaded such that the drawbar assembly is angularly adjusted to properly distribute the tongue weight to the axles of the tow vehicle and trailer.

In a preferred embodiment, the second coupling component includes a horn having means defining an upper recess and means defining a lower hitch pin hole. The first coupling component may include a fixed upper pin that engages the recess and means defining a lower hitch pin hole that is aligned with the hitch pin hole in the second coupling component. When the fixed pin is interengaged with the recess and the lower hitch pin holes of the first and second coupling components are aligned, those holes receive an elongate hitch pin such that the first and second coupling components are coupled. The horn may include a ramp that is interengaged by the fixed pin of the first coupling component. As the drawbar assembly is driven rearward ly, the fixed pin of the first coupling component interengages and rides up the ramp and drops into the recess of the second coupling component.

The hitch head preferably includes a clevis attached to the ball element. The drawbar extension is typically attached by a pivot device to the clevis.

The spring assembly may include a stack of Belleville washer or disc-type springs, which are arranged side by side and oriented in an alternating pattern. Each spring is biased in a direction opposite to that of each immediately adjacent spring. The disc springs may be disposed about an elongate central element that may comprise a tube. An annular tapered spacer may be disposed between each adjacent pair of disc springs. The springs may be stacked within a housing through which the central tube extends. Means may be provided for pre-loading the stack of springs within the housing such that a predetermined dampening or bounce control and a predetermined weight distribution are achieved. Preferably, the housing of the spring assembly is attached to the trailer. The spring assembly may include a depending connector link that is slidably mounted within the housing and resiliently engages the spring components. The depending connector link is pivotally interconnected to a distal location on the drawbar extension. The drawbar extension and the connector link may include corresponding holes. When those holes are aligned they are engaged by a pivot pin, which interconnects the spring assembly and the drawbar extension.

The ball coupler may include a ball receiver and cam means that are alternatable between a first position, wherein the ball is permitted to be introduced into and removed from the ball receiver, and a second position wherein the ball is locked in and suspended from the ball receiver. T he cam means may be operated by a lever apparatus.

Means may be provided for locking the second coupling component in a selected position along the channel. Such means may include a tapered component that is matably interengagable with a corresponding taper carried by the second coupling component. The tapered component is received by the channel and interengaged with the mating taper of the second coupling component to urge the second coupling component into locking interengagement with the channel. A bolt or other means are provided for interconnecting the tapered component and the second coupling component.

The elongate bar may be received in a standard receiving tube mounted to the car and may be secured thereto by a pin. The means for adjusting the angle between the bar and the first coupling component may include a threaded component carried by the first coupling component and interengaged with a nut carried by the bar. Typically, the first coupling component includes a drawbar angle adjuster that is angularly adjusted such that the lower hitch pin hole is angularly displaced relative to the fixed pin. The amount of displacement compensates for the eventual torsion exerted on the drawbar assembly such that when the final adjustments are made, a line extending from the axis of the fixed pin to the axis of the hitch pin hole is substantially perpendicular to the level ground.

The height of the trailer may be adjusted by a standard trailer jack that is mounted to the ball coupler proximate the front of the trailer. A pin may be selectively engaged with an opening in the movable jack post. The jack may be raised such that the pin in the jack post engages the drawbar extension and causes holes in the drawbar extension and connector arm to align so that they may be engaged with a connecting pivot pin.

The angular orientation of the second coupling component is adjusted by means of a mechanism that is carried by the trailer. The angular adjustment mechanism may include an elongate bearing assembly that is pivotally mounted to the jack assembly. The bearing assembly may include a spherical bearing element that is adjustably carried by an elongate pivoting bracket. The bearing assembly is selectively engaged with the drawbar extension to temporarily hold the second coupling component at a desired angular orientation. Means may be provided for selectively interengaging the bearing assembly with the drawbar extension and disengaging the bearing assembly from the drawbar extension. Such means may include a torsionally resilient spring arm that is pivotally interconnected to the elongate arm of the bearing assembly and extends upwardly therefrom. A handle located at the upper end of the torsionally resilient arm is grasped to pivotally raise and lower the bearing assembly. Means may be provided for temporarily retaining the bearing assembly in a condition that supports the second coupling component at a predetermined angular orientation. Specifically, the bearing element may be pivotally interconnected to the support arm and a stop element may be attached to the support arm to hold the bearing element in a locked condition against the drawbar extension. When the torsionally resilient arm is raised, the bearing element is allowed to pivot downwardly to disengage the bearing assembly from the drawbar extension. As a result, the second coupling component and attached drawbar extension are permitted to pivot downwardly under the weight of the coupled drawbar assembly. Latch means are provided for holding the torsionally resilient bar in the raised position.

This invention also features a hitch apparatus wherein the x-axis of the hitch is displaced from and does not intersect the z-axis. Preferably, the x-axis is disposed below the longitudinal axis interconnecting the tow vehicle and trailer axles.

BRIEF DESCRIPTION OF THE DRAWINGS

Other objects, features and advantages will occur from the following description of preferred embodiments and the accompanying drawings, in which:

FIG. 9 is an elevational, partly cross sectional view illustrating how the hitch head assembly, height adjuster, drawbar extension and horn angle adjuster are interconnected to the ball coupler mechanism;

FIG. 10 is a cross sectional view taken along line 10—10 of FIG. 7;

FIG. 11 is an elevational, cross sectional view of the ball coupler;

FIG. 11A is a top cross sectional view of the ball coupler;

FIG. 18A is an elevational, cross sectional view of the spring dampening assembly operating to dampen downward movement by the trailer;

FIG. 18B is an elevated, cross sectional view of the spring dampening assembly operating to dampen upward movement by the trailer;

FIG. 24A is an elevational, partly cross sectional view of the angle adjuster being operated to raise the horn into position for coupling;

DETAILED DESCRIPTION OF PREFERRED EMBODIMENTS

Figure 1:
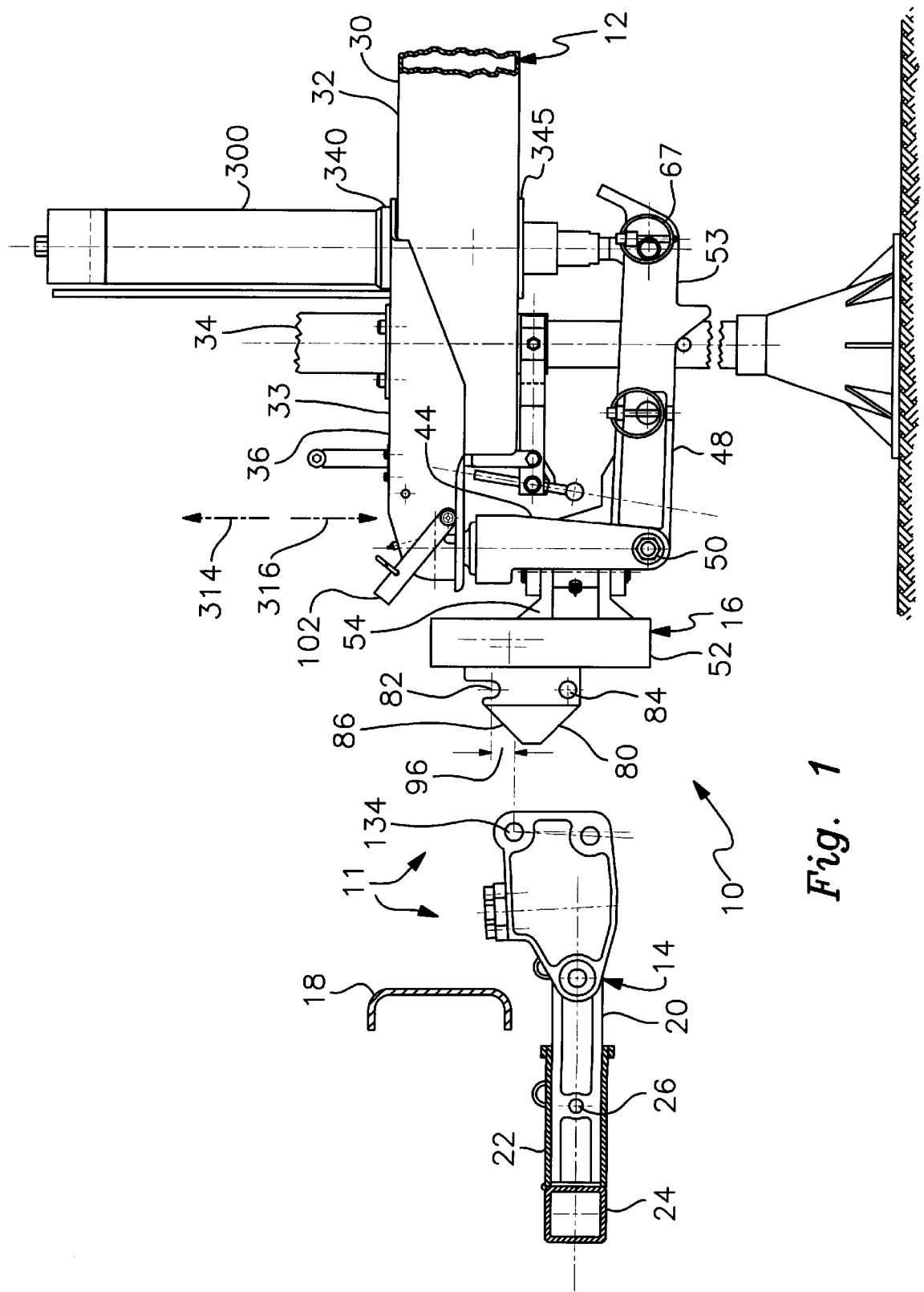
FIG. 1 is a elevational side view of the trailer hitch of this invention with the hitch head assembly suspended from the front end of a trailer and the drawbar assembly interconnected to a tow vehicle; the hitch head assembly and drawbar assembly are depicted prior to coupling in accordance with this invention.

There is shown in FIG. 1 an adjustable trailer hitch 10 that is designed for attaching an A-frame trailer 12 to a tow vehicle, not specifically shown. Hitch 10 is suited for use in connection with various types of trailers. The adjustable hitch of this invention is likewise designed to be used with all types and sizes of tow vehicles. Neither the type of tow vehicle nor the type of trailer should be construed as a limitation of this invention. It should also be understood that the axles and wheels of both the trailer and the tow vehicle are not depicted. These are standard components that do not comprise a part of the invention. Their relative positioning and operation should be understood to those skilled in the art. As with all weight distributing trailer hitches, the adjustable hitch of this invention is intended to properly distribute the drawbar weight of the trailer to the front and rear axles of the tow vehicle and trailer, respectively, such that a stable, levelized ride is achieved.

Hitch apparatus 10 includes a forward drawbar assembly 14 and a rearward hitch head assembly 16. The hitch head assembly is attached to and suspended from trailer 12 in a manner that will be described more fully below. The drawbar assembly is disposed beneath the vehicle bumper 18 and includes an elongate bar 20, which preferably has a square cross sectional shape. Bar 20 is selectively inserted in a complementarily shaped receiver tube 22. The receiver tube is secured to and extends from a transverse mounting bar 24. This bar extends between and is attached to the longitudinal frame components of the tow vehicle. This form of attachment is conventional. Indeed, the transverse bar 24 and receiver tube 22 are widely employed for various types of known trailer hitches. Elongate bar 20 is secured to tube 22 by a transverse pin 26.

Figure 2:
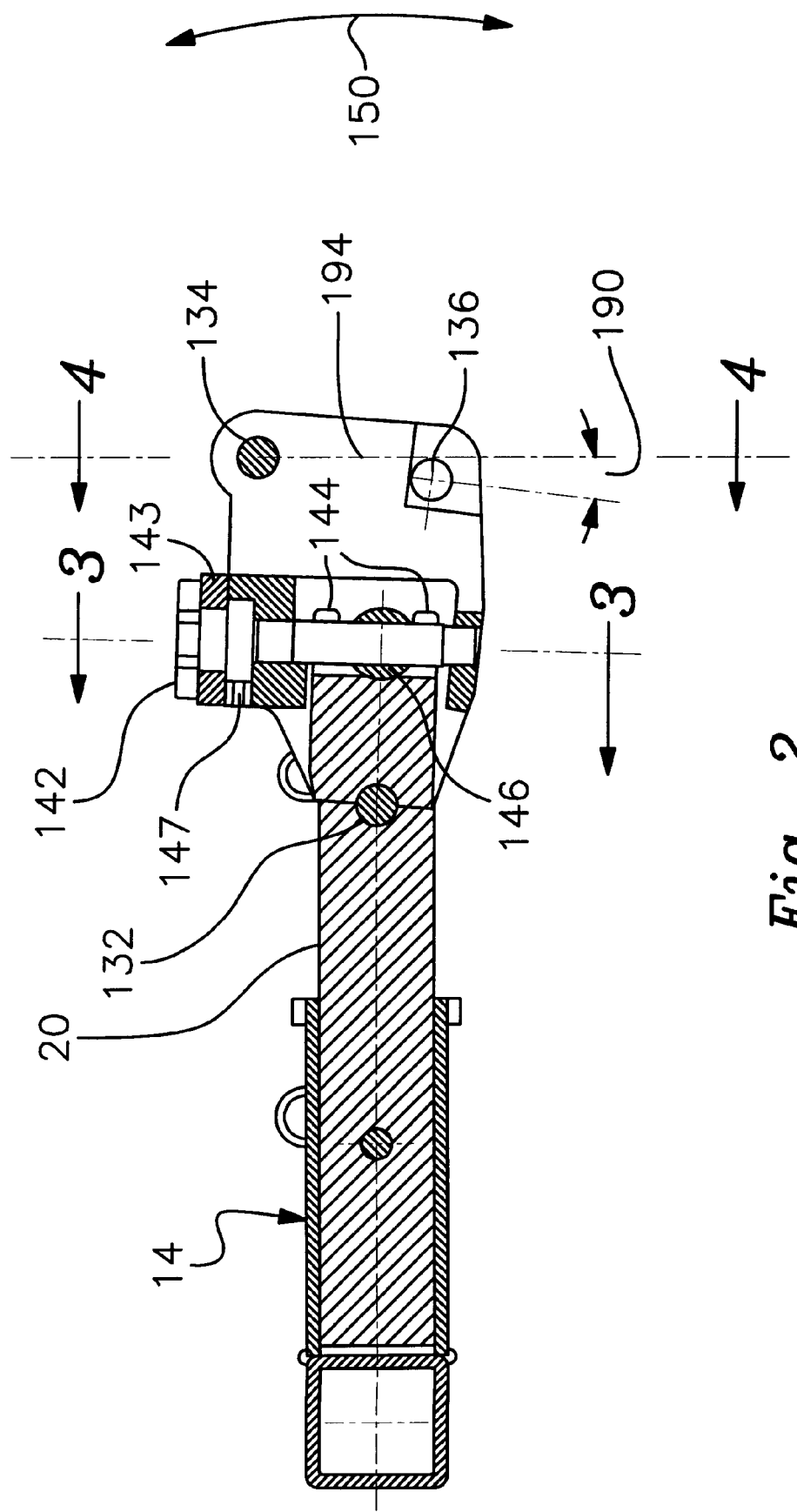
FIG. 2 is an elevational, cross sectional view of the drawbar assembly.
Figure 3:
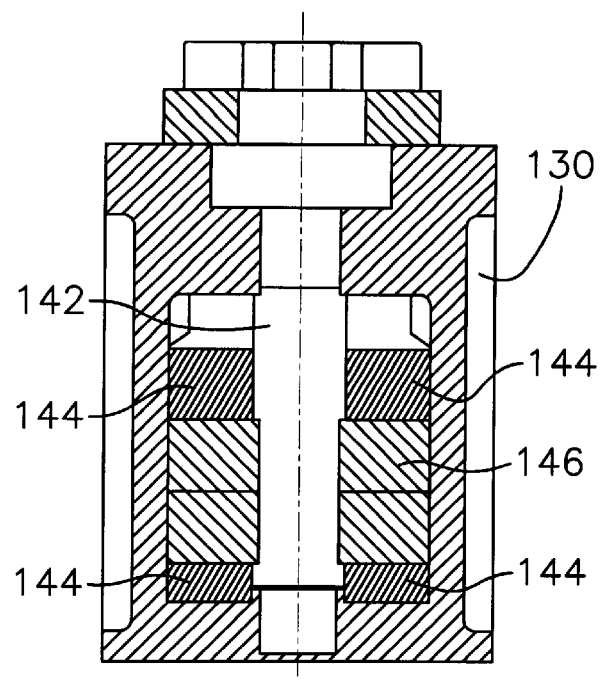
FIG. 3 is a cross sectional view taken along line 3—3 of FIG. 2.
Figure 4:
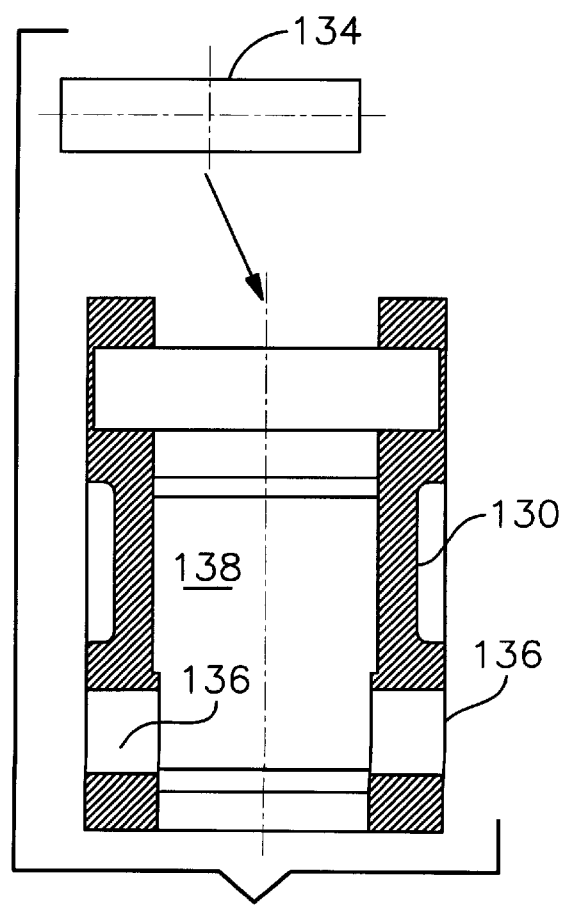
FIG. 4 is an elevational, cross sectional view taken along line 4—4 of FIG. 2.
Figure 5:
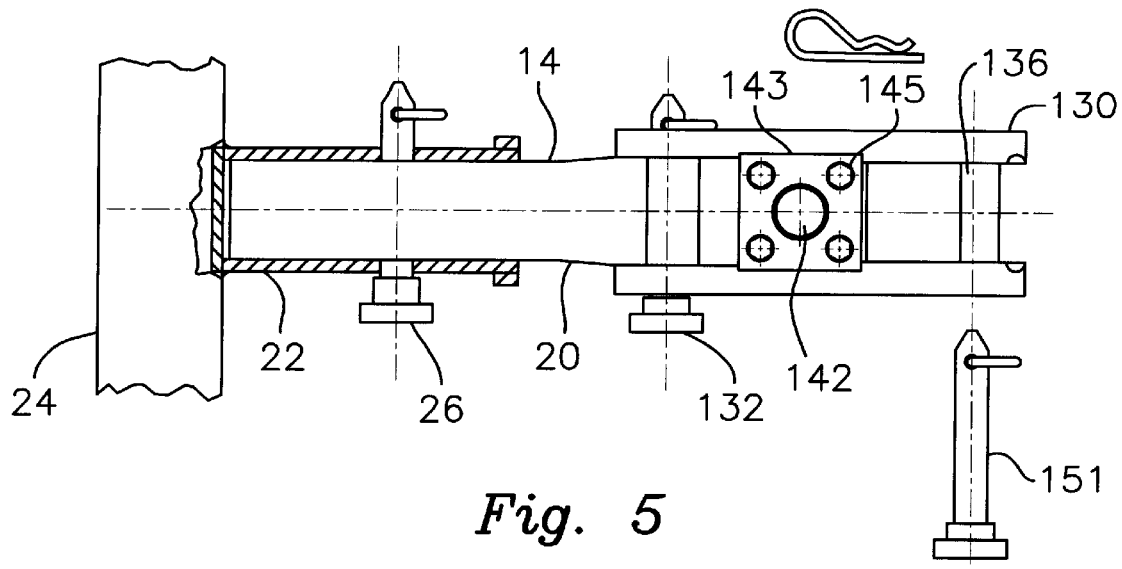
FIG. 5 is a top, partly cross sectional view of the drawbar assembly.

As illustrated in FIGS. 2–5, drawbar assembly 14 includes a first, angularly adjustable coupling component 130 that is pivotally interconnected by a pin 132 to bar 20. Component 130 comprises a shank having a fixed upper pin 134 and a pair of aligned lower hitch pin holes 136. Component 130 also includes a central, longitudinal opening 138, FIG. 4. The rearward end of opening 138 receives elongate bar 20. An angle adjustment mechanism 140 includes a hex headed adjustment screw 142, which extends transversely through coupling component 130. Screw 142 extends through a mounting plate 143 into the coupling component. The plate itself is held in place by a plurality of retaining bolts 145. The inner, forward end of bar 20 includes four fingers 144 (two of which are shown in FIG. 2), which retain an adjustment nut 146. This nut threadably engages adjustment screw 142. The upper and lower ends of screw 142 are rotatably interengaged with coupling component 130. As a result, screw 142 is operated to adjust the angle between bar 20 and coupling component 130 in the manner indicated by double-headed arrow 150, FIG. 2. At a benchmark angle of "0°" a line connecting the axes of pin 134 and hitch pin holes 136 is perpendicular to the longitudinal axis of bar 20. In order for the drawbar assembly 14 to exhibit proper weight distribution, this angle must be increased by an angle of from less than 1° to as much as 10°. Typically, the screw 142 is rotated such that the rearward end of component 130 is lowered and holes 136 are adjusted forwardly of pin 134. This operation and its importance are described more fully below. A set screw 147 locks screw 142 in place in a selected angle. A hitch pin 151 is interengaged with hole 136 when coupling is performed in a manner that likewise will be described more fully below.

Figure 6:
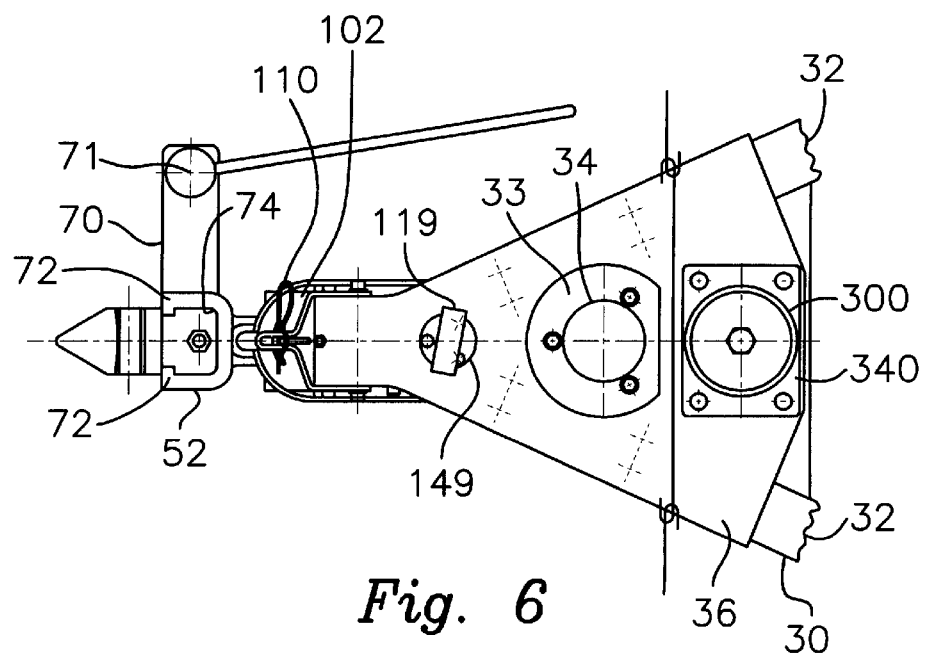
FIG. 6 is a top plan view of the front end of the trailer's A-frame and the attached hitch head assembly and sway control mechanism.

As shown in FIGS. 1 and 6, the front end of trailer 12 has a generally A-shaped frame 30 comprising a pair of elongate frame elements 32 that converge at the forward end of the trailer. A standard trailer jack 34 extends upwardly from ground G. through a coupling plate 33 carried by ball coupler 36 at the forward end of trailer frame 30.

Figure 7:
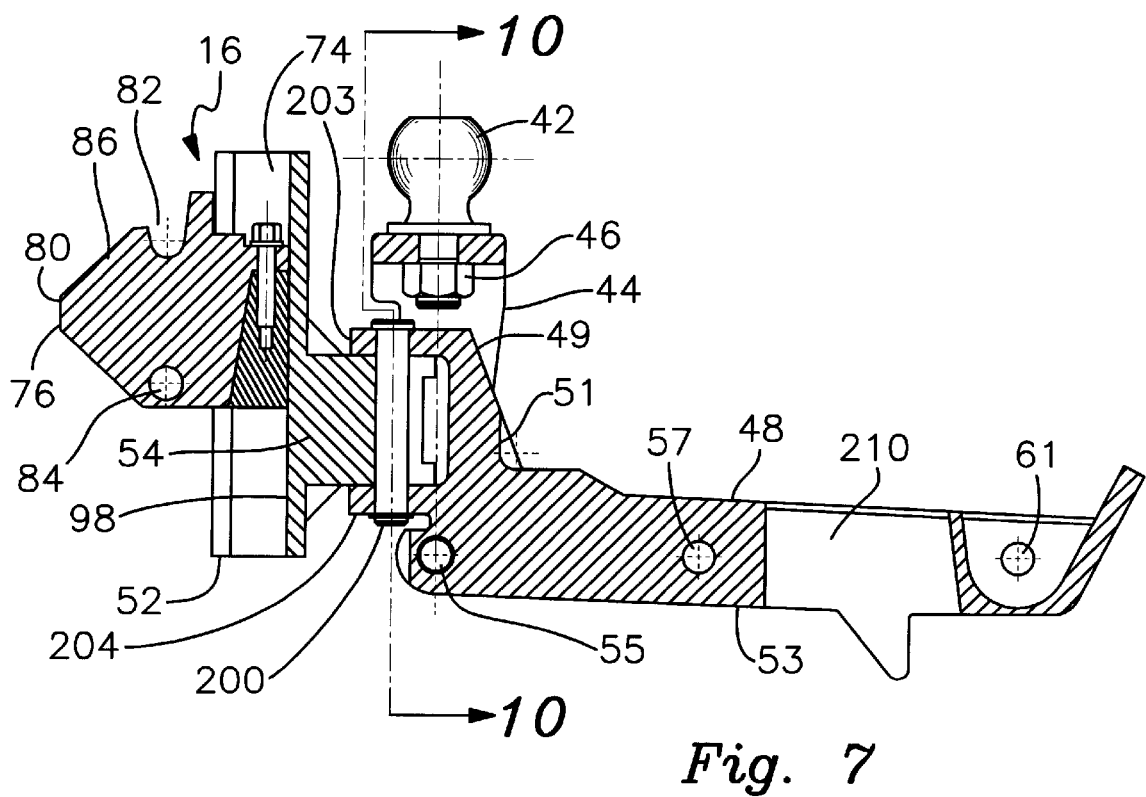
FIG. 7 is an elevational, cross sectional view of the hitch head assembly, height adjuster and drawbar extension.

Hitch head assembly 16, also shown in FIGS. 7–10, includes a ball element 42 that is secured to a clevis 44 by a threaded bolt and nut attachment 46. Alternatively, the ball element may be welded to the clevis. The ball element comprises the y-axis coupling about which the rig rotates when one of the wheels strike a curb, for example. The y-axis is in the line of travel. A one-piece drawbar extension 48 is secured to clevis 44 by a pivotor bolt 50. Extension 48 includes a generally vertical portion 49 having a pocket 51, FIGS. 7 and 9. A rearward extension portion 53 is unitarily interconnected to and extends rearwardly of portion 49. Extension portion 53 includes a generally vertical slot 210 through which jack 34 extends. As shown in FIG. 7, portion 53 includes a forward hole 55 that receives pin 50. Portion 53 also includes openings 57 and 61, FIG. 7, which are interengaged by respective pins 63 and 67, FIG. 8, in the manner that will be described more fully below.

A channel member 52 is pivotally interconnected to drawbar extension 48 by a generally vertical pivot pin 200, FIGS. 7 and 9. More particularly, channel portion 52 is attached to an integral mounting segment 54 that is received between upper and lower ears 203 and 204 drawbar extension portion 49. Pin 200 extends through aligned holes in segment 54 and ears 203 and 204. As a result, channel member 52 is pivotal about a z-axis relative to drawbar extension arm 48 in the manner indicated by double headed arrow 56 in FIG. 8. Pin 200 effectively forms a z-axis coupling.

A mounting bracket 70 extends integrally from one side of channel 52. Bracket 70 is employed to carry a friction sway control device 71, which is shown in connection with FIG. 6. The distal end of device 71 is attached to frame 30 in a conventional manner. Because of the positioning of device 71 it assists the spring assembly in dampening bounce of the trailer in a manner described more fully below.

Figure 8:
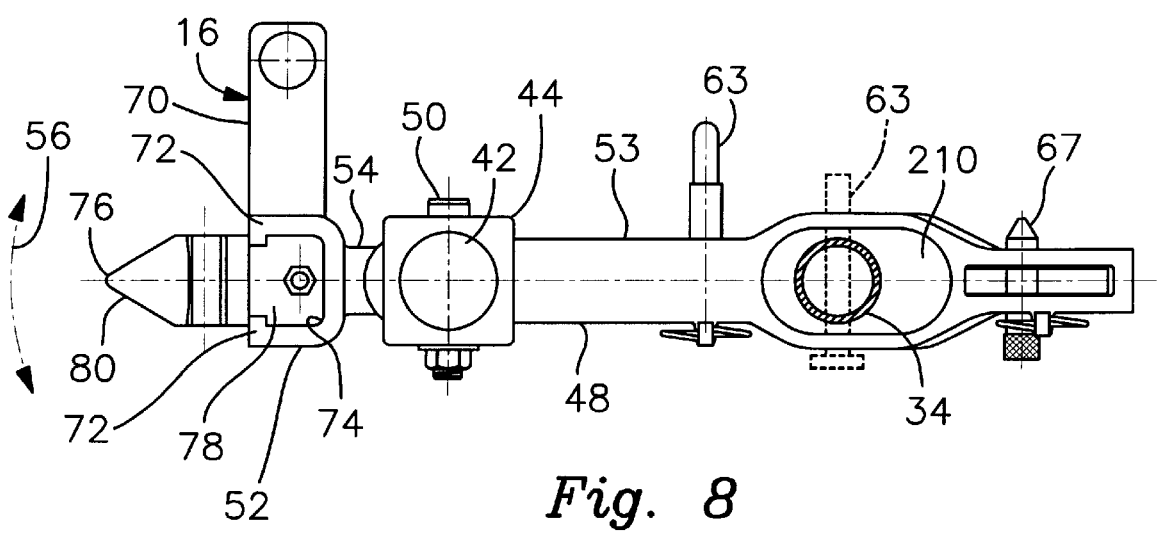
FIG. 8 is a top plan view of the hitch head assembly, height adjuster and drawbar extension.

Channel member 52 includes a pair of inwardly turned segments 72, FIGS. 6 and 8, and a central, longitudinal slot 74. A second coupling component 76 is slidably interengaged with channel 52. Component 76 comprises an insertion portion 78 that is received within and has a shape generally conforming to the shape of longitudinal channel slot 74. The coupling component further includes a horn portion 80 that is unitarily interconnected to insertion portion 78. As best shown in FIGS. 7 and 9, horn portion 80 includes an upper recess 82 and a lower hitch pin hole 84. An incline or ramp 86 extends from the forward end of horn 80 to a point proximate recess 82. In FIG. 9, horn 80 is shown interconnected with a tapered element 90 by means of a connecting bolt 92. When horn 80 and tapered element 90 are not interconnected in this manner, the horn is free to slide vertically within channel 52 as indicated by double-headed arrow 96, FIGS. 1 and 9. Tapered element 90 includes an inclined surface that matingly engages a complementary inclined surface on horn 80. The tapered element has a thickness at its lower end that is slightly larger than the distance between the lower end of the complementary taper on horn 80 and the inside wall 98 of channel 52. As a result, when tapered element 90 is inserted into the channel and matingly interengaged with horn 80, the horn is urged or squeezed into locking, frictional interengagement with inturned portions 72 of channel 52. In this manner, horn 80 may be positioned and locked at any desired location along channel 52 by interengaging bolt 92 with the horn and element 90 at that location. The importance of this adjustment is described more fully below.

The forward end of ball coupler 36 includes a ball coupling receiver 100, shown alone in FIGS. 11 and 11A. A generally U-shaped lever 102, FIGS. 1, 6, 9, 11 and 11A, is pivotally interconnected to a cam element 104 located proximate the opening of coupling receiver 100. As best shown in FIGS. 11 and 11A, cam 104 includes a recess 106 and a rounded locking portion 108. When lever 102 is pivoted rearwardly (FIGS. 11 and 11A) the hitch ball 42 may be introduced into and removed from coupling receiver 100. To lock the ball, and thereby hitch head 16, into the trailer and the ball is introduced into the coupling receiver. The lever 102 is then pushed forwardly into the position shown in FIGS. 6 and 9. A latching pin 110 is connected through corresponding holes in lever 102 and in ear 112 (FIG. 11) of coupler 36. This holds the lever closed or latched. In this position, the rounded portion 108 of cam element 104 is interengaged beneath ball 32. The ball cannot be removed from the coupling receiver 100. It is latched firmly in place. As a result, the entire hitch head assembly 14 is attached to and suspended from the hitch head coupling receiver 100. In alternative embodiments, a slide cam mechanism may be employed to hold the ball in the ball coupler.

As shown in FIG. 9, a horn angle adjuster 120 is mounted to coupler 36 and jack 34. In particular, adjuster 120 includes a bracket assembly 122 pivotally interconnected to the jack by a pivot 124 and a clamp 125, Assembly 122 bears against pocket 51 of hitch head 16. The bracket assembly is selectively raised and lowered by a torsionally resilient spring actuator arm 126 that is slidably interengaged with coupler 36. A handle 119 is formed at the upper end of arm 126.

Figure 12:
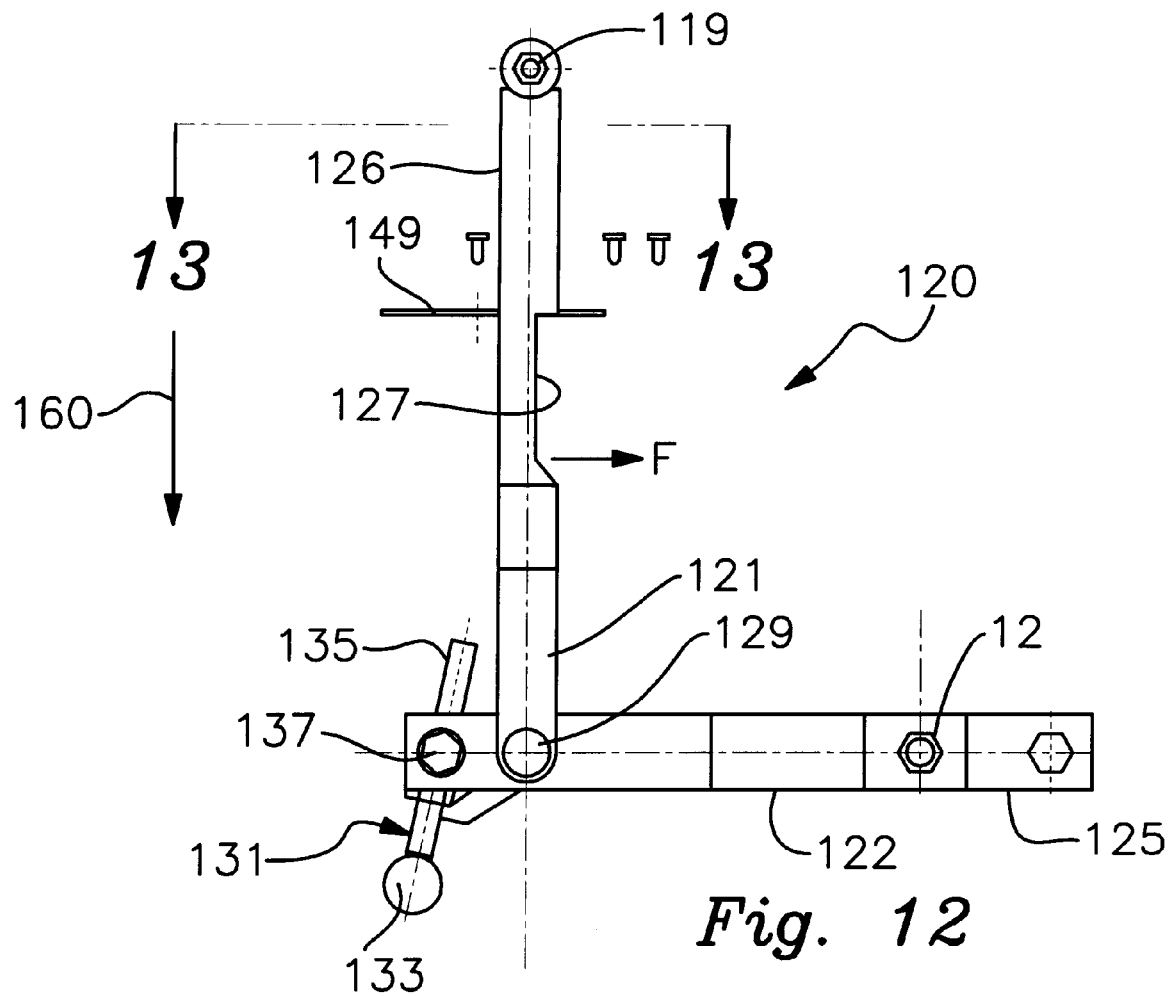
FIG. 12 is an elevational side view of the horn angle adjuster apparatus.
Figure 13:
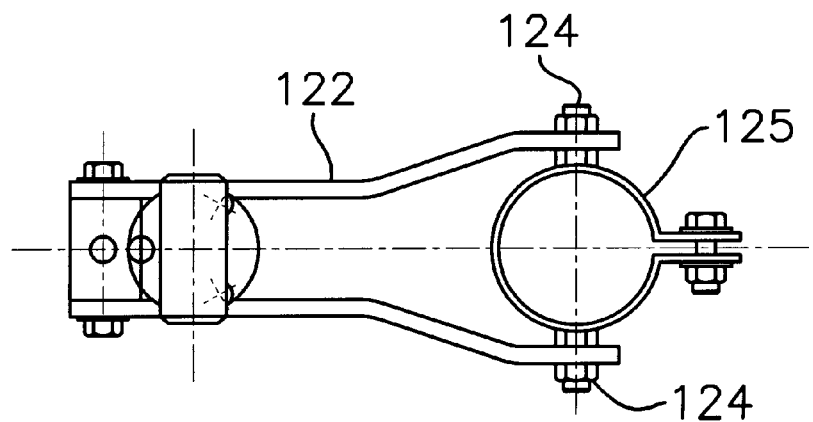
FIG. 13 is a top plan view of the horn angle adjuster apparatus.
Figure 14:
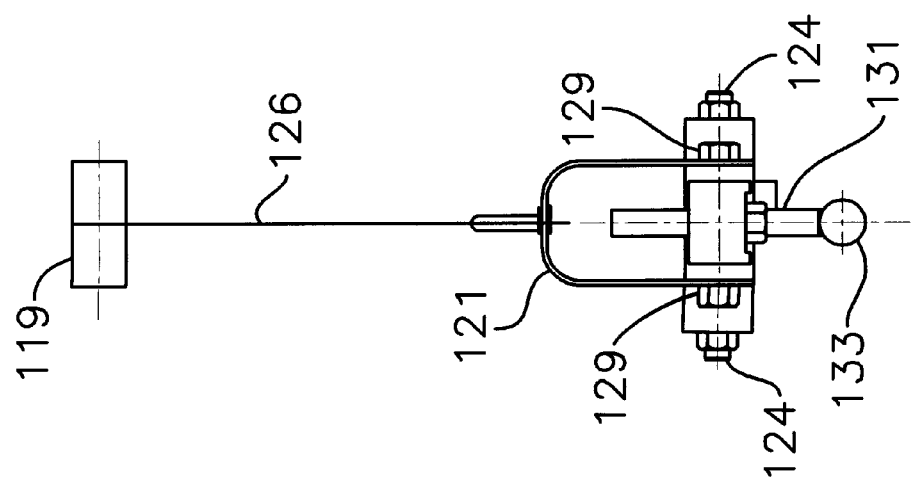
FIG. 14 is an elevational end view of the horn angle adjuster apparatus

Horn angle adjuster 120 is shown alone in FIGS. 12–14. Actuator arm 126 comprises a thin blade of spring steel having a notch or key slot 127 formed therein. The lower end of arm 126 is interconnected by a U-shaped hanger 121 and a pivot 129 to pivoting bracket 122. As best shown in FIG. 13, pivoting bracket 122 comprises a pair of diverging elements are secured by a pair of pivot pins 124 to clamp 125. This clamp encircles the jack housing and fastens the angle adjuster to jack 34 in the manner best shown in FIGS. 1 and 9.

Figure 15:
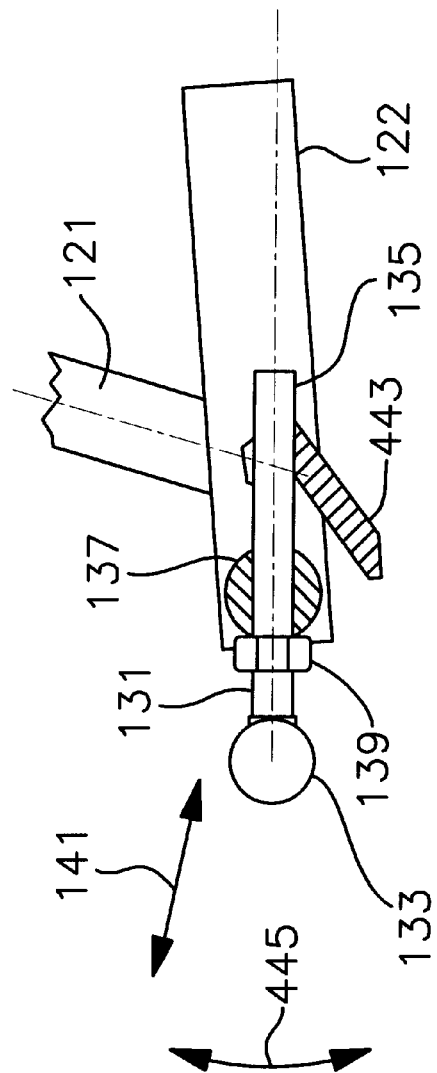
FIG. 15 is an elevational, partly cross sectional view of the adjustable bearing assembly.

An adjustable bearing assembly 131 is pivotably carried at the distal end of bracket 122. Bearing assembly 131 includes a spherical cam or bearing element 133 carried at the end of a pivot or lever arm 135. The pivot arm is pivotally interconnected to the distal ends of bracket 122 by a mandrel 137 that is interconnected between the elongate elements of bracket 122. Mandrel 137 permits bearing 133 and attached lever arm 135 to pivot up and down in the manner indicated by double-headed arrow 445. Arm 135 includes threads proximate bearing 133 and an adjustment nut 139 threadably engages arm 135. This permits bearing element 133 to be adjusted forwardly and rearwardly in the manner indicated by double-headed arrow 141 in FIG. 15. A stop 443 is welded between the elongate elements of bracket 122 proximate the pivot point of hanger 121. Stop 443 limits the degree to which lever arm 135 and bearing element 133 can pivot upwardly.

Figure 16:
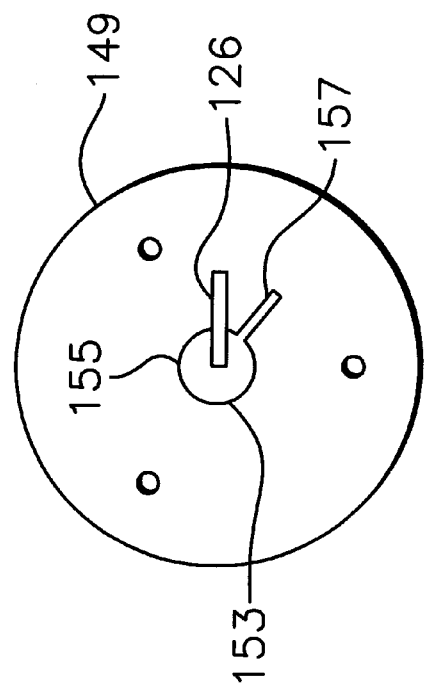
FIG. 16 is a plan view of the latching assembly for holding the angle adjuster in a raised, disengaged condition.

Spring arm 126 is inserted through a slotted plate 149 (FIGS. 6, 9, 12 and 16) in coupler canopy 36. As best shown in FIG. 16, slotted plate 149 includes a keyway 153 having a central portion 155 and a radial portion 157. Arm 126 is normally biased such that, when the arm is raised, it is offset by approximately 100 from slotted portion 157. The notch 127 is received by central portion 153 and permits arm 126 to torsionally rotate relative to the mounting plate.

Angle adjustment mechanism 120 is selectively operated to engage the drawbar extension in the following manner. Handle 119 is grasped and arm 126 is rotated until it is aligned with slotted portion 157 of keyway 153. The arm 126 is then lowered as indicated by arrow 160 in FIG. 12. Bracket 122 rotates about pivots 124. Spherical element 133 of bearing mechanism 131 is interengaged with pocket 51 of drawbar extension 48 in the manner shown in FIG. 9. The bracket 122 pivots downwardly and bearing mechanism 131 is pivoted upwardly until lever arm 135 engages stop 443. At this point, the lever arm has pivoted slightly past the longitudinal axis of bracket 122 such that bearing mechanism 131 is locked in place against pocket 51. This causes the drawbar extension and the hitch head to be pivoted about ball 42 and ball receiver 100 in the manner indicated by arrow 164 in FIG. 9. The importance of this adjustment is described more fully below. In the lowered position, the spring arm 126 is prevented from unwinding and returning to its normal condition because it is latched within keyed slot 157.

To release bearing mechanism 131 from drawbar extension, the user simply grasps handle 19 and pulls arm 126 upwardly. This causes bracket 122 to rotate about pivots 124 on clamp 125. Cam element 133 rotates against cam follower pocket 51 and lever arm 135 pivots about mandrel 137. Eventually, bearing mechanism 131 disengages the drawbar extension pocket and pivots into the condition shown in FIG. 12. As a result, extension 48 and hitch head 16 pivot in the direction indicated by arrow 170 in FIG. 9 and return to an unbiased or unpropped position. Channel 52 and horn 80 likewise drop downwardly with the drawbar extension and hitch head.

Figures 17, 18:
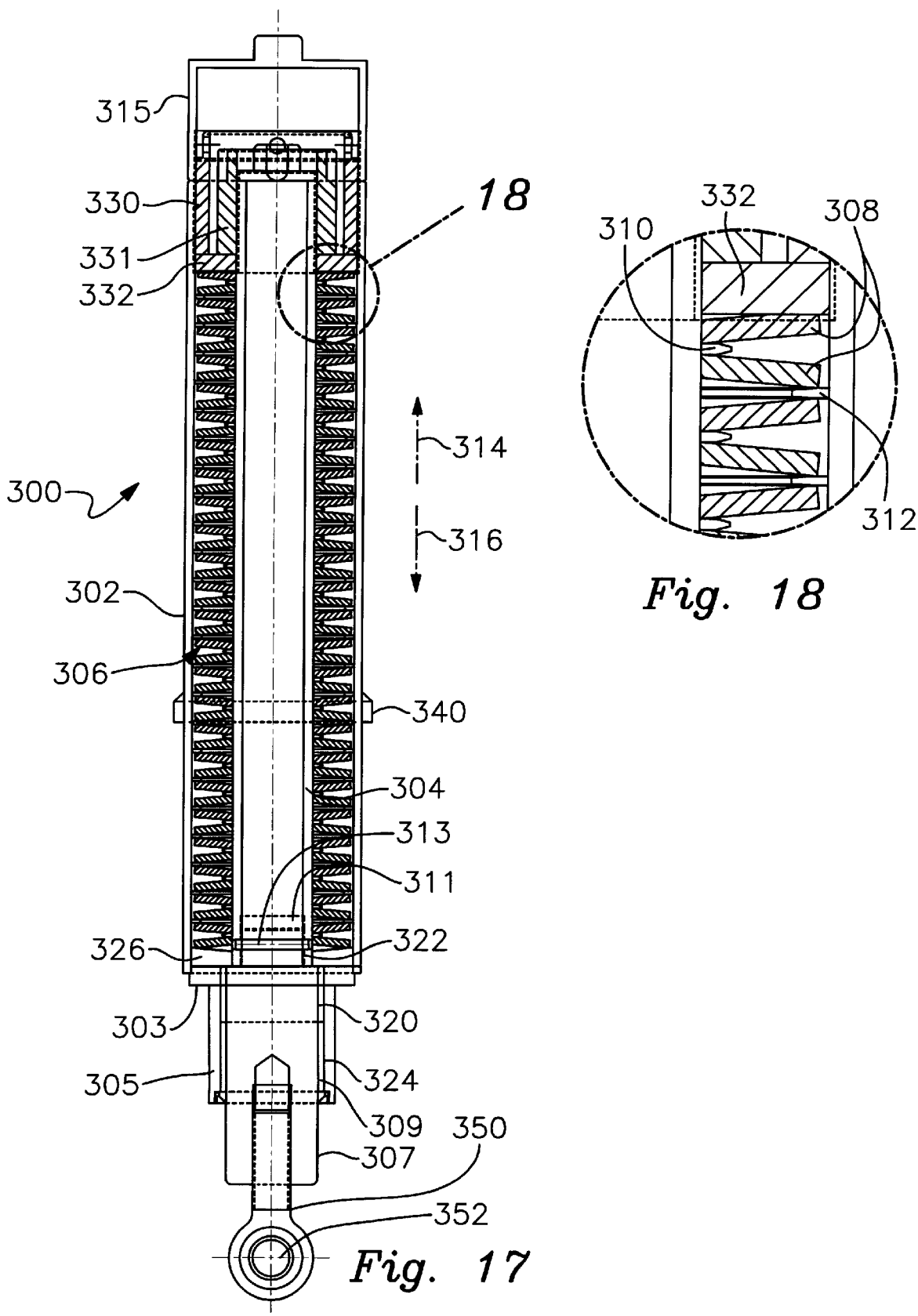
FIG. 17 is an elevational, cross sectional view of the pre-loaded dual action spring assembly of this invention.
FIG. 18 is an elevational, cross sectional view of the upper end of the spring assembly.

The distal end of rearward extension portion 53 is resiliently interconnected to trailer frame 30 by a pre-loaded compression spring assembly 300, FIG. 1. The spring assembly is depicted in detail in FIGS. 17 and 18. As shown therein, this assembly comprises a generally tubular outer housing 302. As shown in FIGS. 1, 6 and 17, spring assembly 300 is welded by means of a lower plate 345 to trailer frame 30. A bracket 340 is bolted to coupler 36 such that the spring assembly extends centrally through the A-frame of the trailer in the manner best shown in FIG. 6. Bracket 340 resist stresses placed on plate 345 and prevents rocking of housing 302. Plate 345 is welded between housing 302 and trailer frame 30 at the bottom of the frame.

A plate 303 having a central opening is fastened at the lower end of housing 302. A tubular, reduced diameter lower housing 305 is aligned with and depends from plate 303. An elongate inner tubular member 304 is mounted longitudinally within housing 302. The compression spring is defined by a stack of disc springs, typically comprising Belleville washers 306 that are mounted within housing 302 such that they are disposed annularly about inner tube 304. As will be known to those skilled in the art, Belleville washers include a generally dish or truncated conical shape wherein the inner diameter is displaced angularly from the outer diameter of the washer. The individual spring washers 308, best shown in FIG. 18, are stacked side by side in an alternating arrangement. In other words, each washer is oriented to face in a direction opposite to that of each adjacent washer. Additionally, smaller diameter annular spacers 310 and large diameter annular spacers 312 are disposed between alternating pairs of spring washers 308. In alternative embodiments the spacers may be eliminated and a larger spring stack may be used. A lower thrust washer 326 sits on lower plate 303 and supports spring stack 306. A lower thrust unit 307 is slidably received through a bearing 309 mounted within lower housing portion 305. The upper end of lower thrust unit 307 engages thrust washer 326. A connector link 350 is attached by welding, threads or other appropriate means to lower thrust unit 307. The connector link includes an axial hole 352 that is employed to interconnect the spring assembly to the drawbar extension. Hole 352 is aligned with a corresponding hole formed through a rearward distal end of drawbar extension 48 (see hole 61 in FIG. 7). These aligned holes are engaged by pin 67, FIG. 1, such that the drawbar extension is pivotally interconnected to spring assembly 300. This point of interconnection defines an x-axis coupling for the hitch, i.e. it defines the axis about which the tow vehicle and trailer rotate relative to one another when encountering a bump or dip in the road. A thrust unit extension 311 is threadably interconnected to the interior diameter of tube 304 at the lower end of the tube. A pin 313 further interconnects extension 311 and tube 304.

The upper end of housing 302 includes a cap 315 that is threadably attached or otherwise removably attached onto an annular retaining bolt 330. This bolt is also threadably connected to the inside diameter of housing 302. An upper thrust washer 332 is disposed about tube 304 and positioned between retaining bolt 330 and the upper end of spring stack 306. Both lower thrust washer 326 and upper thrust washer 332 include tapered faces that permit flexing of the lower and upper disc springs, respectively. An upper thrust nut 331 is threadably attached to the outside diameter of tube 304 at the upper end of the tube.

As best shown in FIG. 18, spacers 310 and 312 have tapered upper and lower surfaces that match the angle or taper of the respective adjoining disc springs 308. This permits the springs to exhibit an optimum degree of flex when compression is applied to the spring stack.

When spring assembly 300 is interconnected between trailer 12 and drawbar extension 48, the above described configuration enables the spring assembly to dampen both upward trailer movement in the direction of arrow 314 and downward trailer movement in the direction of arrow 316. During travel, when the trailer bounces or is forced downwardly at the trailer ball 42, in the direction of arrow 316, the drawbar extension 53 pivots downwardly on pin 50 (FIGS. 1 and 8). This causes pin 67 to pull downwardly on connector link 350. Simultaneously, ball coupler 36, the trailer frame 30, housing 302 and spring stack 306 are hinging upwardly on trailer ball 42. Because connector link 350, thrust unit 307, center tube 304 and nut 331 are an interconnected assembly, nut 331 is pulled in the manner shown in FIG. 18A against upper thrust washer 332. This action further compresses spring stack 306, which has been precompressed by retaining bolt 330; thus the spring stack 306 resiliently cushions the downward movement and restores the levelness of the tow car and trailer. It should be noted that in alternative versions, other types of dual action spring and alternative dampening devices may be utilized.

Conversely, when the trailer bounces or is forced upwardly at trailer ball 42, arrow 314, the previously described motion is reversed. Connector link 350 and thrust unit 307 push upwardly against thrust washer 326 and precompressed spring stack 306 in the manner shown in FIG. 18B. This dampens the upward movement and restores the levelness of the coupled vehicles.

Accordingly, motion of the trailer in either direction is resiliently resisted by the spring stack 306. The precise number of disc springs is not a limitation of this invention, although in a preferred embodiment, 48 springs are employed. In such embodiments, twenty-three outer spacers 312 and twenty-four inner spaces 310 are utilized.

When spring assembly 300 is first installed, the spring stack 306 is preloaded to accommodate a predetermined tongue weight. This is accomplished using a hydraulic press. Stack 306 is compressed a desired amount as measured by a suitable gauge. At the desired level, retaining bolt 330 is screwed into housing 302 and against upper thrust washer 332. The size and strength of the disc springs which are used and/or the preloading may be varied as required by the particular tongue weight and trailer applications involved.

Hitch apparatus 10 is installed to securely couple trailer 12 to the tow vehicle and to properly distribute the tongue weight to the axles of the tow vehicle and the trailer. The hitch is installed in the manner illustrated in FIGS. 19–29.

Figure 19:
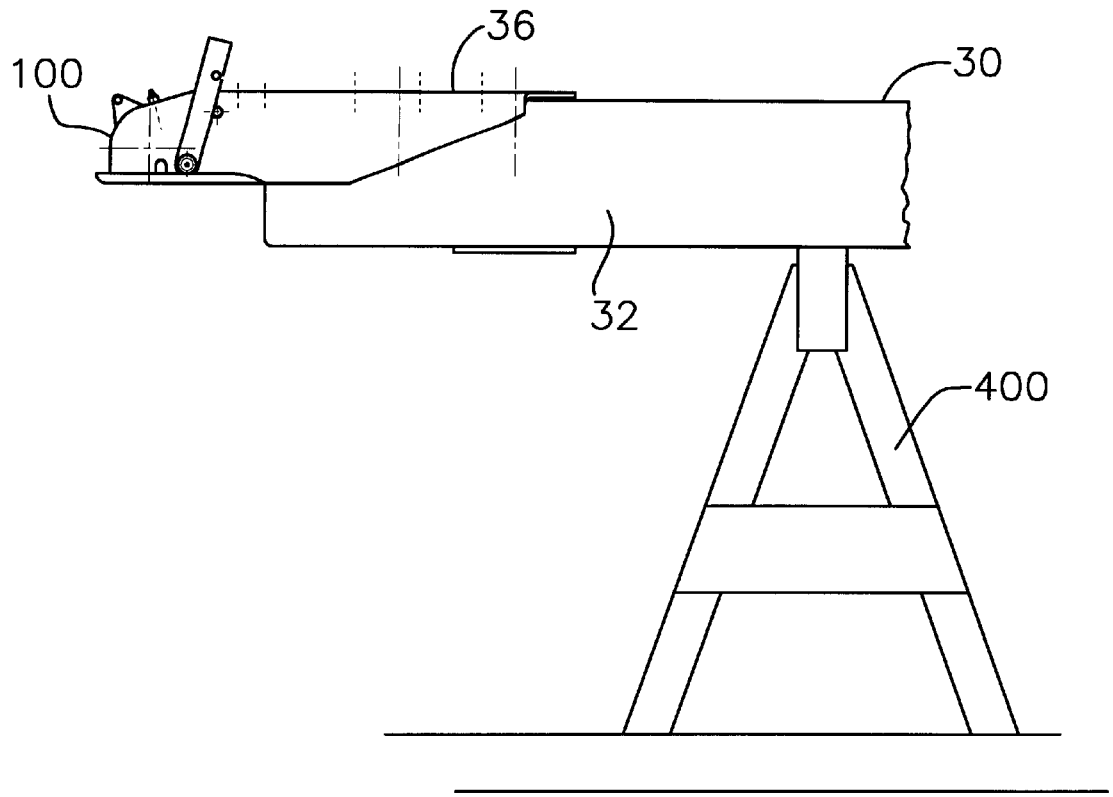
FIG. 19 is an elevational side view of the front end of an A-frame trailer supported by a temporary drawbar support and with the ball coupler welded thereto.
Figure 20:
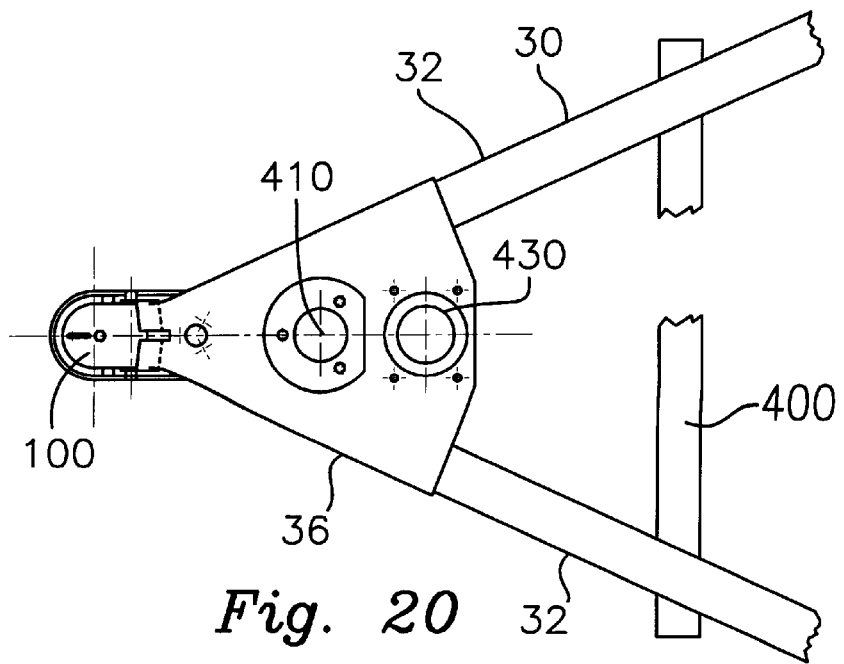
FIG. 20 is a top plan view of the front end of the trailer shown in FIG. 19.

Ball coupler 36 is installed on trailer 12 in the manner specifically shown in FIGS. 19 and 20. Trailer frame 30 is placed upon a support 400 such that it is approximately level to the ground. Coupler 36 is then interengaged with the forward end of frame 30 such that ball receiver 100 is disposed beyond the end of the frame. The coupler 36 is then welded to frame 30 along each of frame elements 32.

Figure 21:
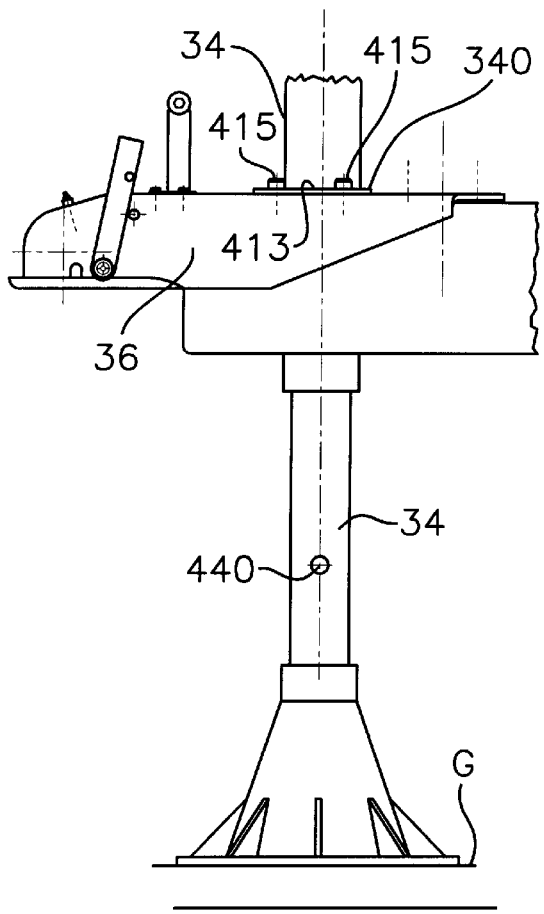
FIG. 21 is a side, elevational view of the front end of the trailer with the ball coupler and jack apparatus attached thereto.

After the coupler is attached, jack 34 is interconnected in the manner shown in FIG. 21. Specifically, the jack extends through a hole 410 (FIG. 20) in coupler 36. A bracket 413 and bolts 415 secure the jack to hood 36. A hole 440, the importance of which is described more fully below, is formed through the jack post. The jack is installed such that hole 440 is formed at approximately 90 degrees to the axis of coupler 36. This step may also be accomplished before the jack is bolted to the coupler. The previously described supports 400 may be removed and jack 34 may be operated so that the trailer is approximately level with ground G.

Figure 22:
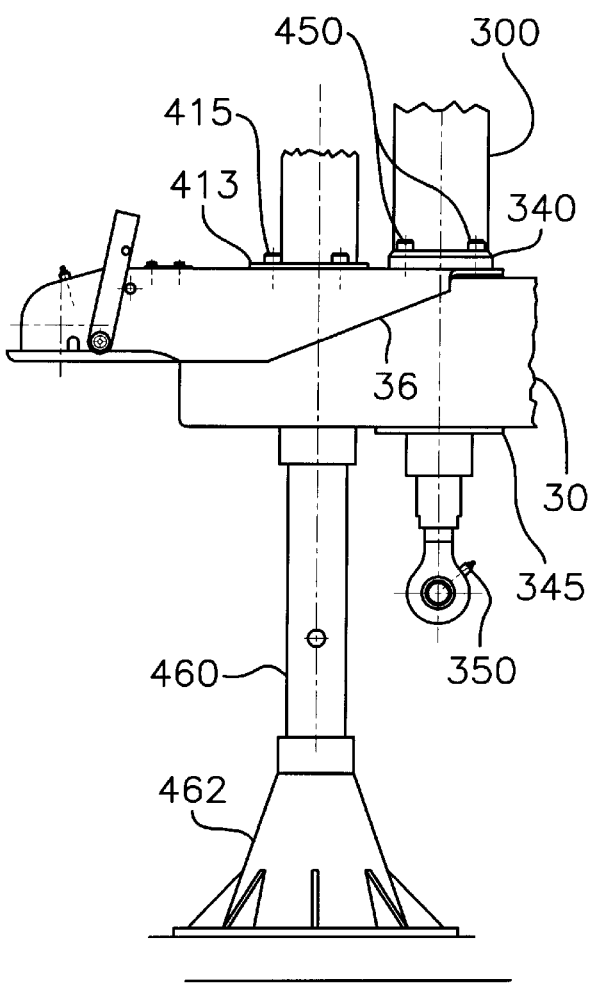
FIG. 22 is a side, elevational view of the front end of the trailer with the ball coupler, jack apparatus and spring assembly attached thereto.

Next, spring assembly 300 is attached to coupler 36 in the manner shown in FIG. 22. Specifically, the spring assembly is inserted through opening 430 in coupler 36 (see FIG. 20). Bracket 340 is then secured to coupler 36 by bolts 450, FIG. 22. As a result, connector link 350 hangs below the frame 30 of the trailer. Plate 345 contains a hole through which housing 302 is fitted and is welded between the spring assembly and the lower surface of trailer frame 30. As a result, the spring assembly is securely supported by the trailer frame and the coupler. Before the spring assembly 300 is installed, the approximate tongue weight is determined. The installer then adjusts the spring stack by means of a hydraulic press so that the spring stack 306 is pre-loaded to accommodate the predetermined tongue weight.

Figure 23:
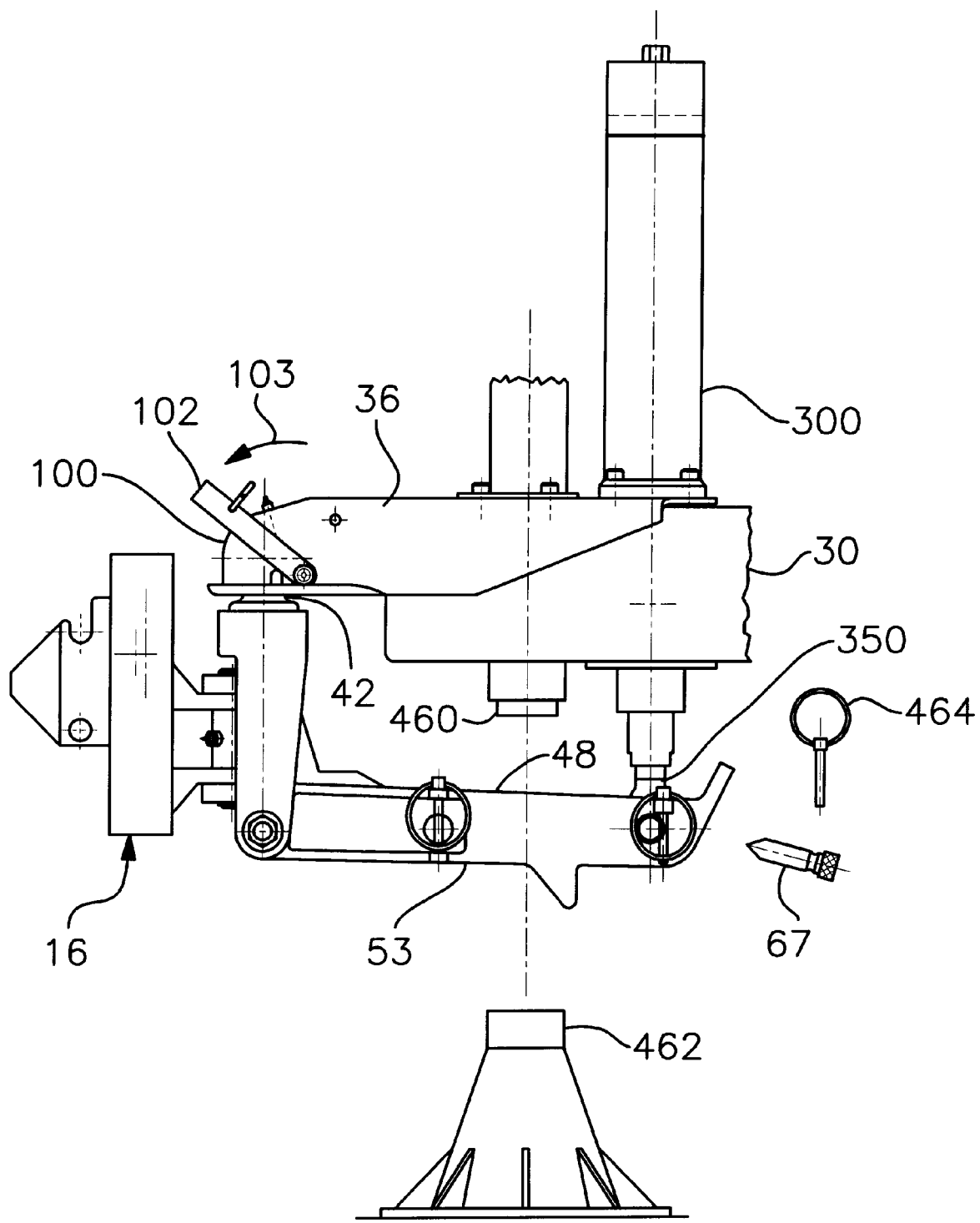
FIG. 23 is a side, elevational view of the front end of the trailer after the hitch head has been attached to the ball coupler and spring assembly, and with the jack in an elevated condition.

Hitch head assembly 16 is then attached to the coupler 36 and spring assembly 300 in the manner shown in FIG. 23. To accomplish this, the trailer frame 30 is lowered by jack 34 onto the support element 400, shown in FIGS. 19 and 20. Jack 34 is then raised such that the jack support post 460 is lifted and separated from the jack support stand 462 in the manner shown in FIG. 23. Hitch head 16 is engaged with coupler 36 such that the ball component 42 is inserted into ball receiver 100. Lever 102 is closed in the direction of arrow 103 such that the hitch head is suspended from the coupler. Portion 53 of drawbar extension 48 is pivoted upwardly to align the opening 61 (FIG. 7) in portion 53 with the opening 352 (FIG. 17) in connector link 350. Pin 67 is engaged with these aligned holes so that the distal end of drawbar extension 48 is attached to connector link 350 of spring assembly 300. A hitch pin clip 464 is engaged with a transverse opening in pin 67 to hold the engaged pin in place within the aligned holes.

Figure 24:
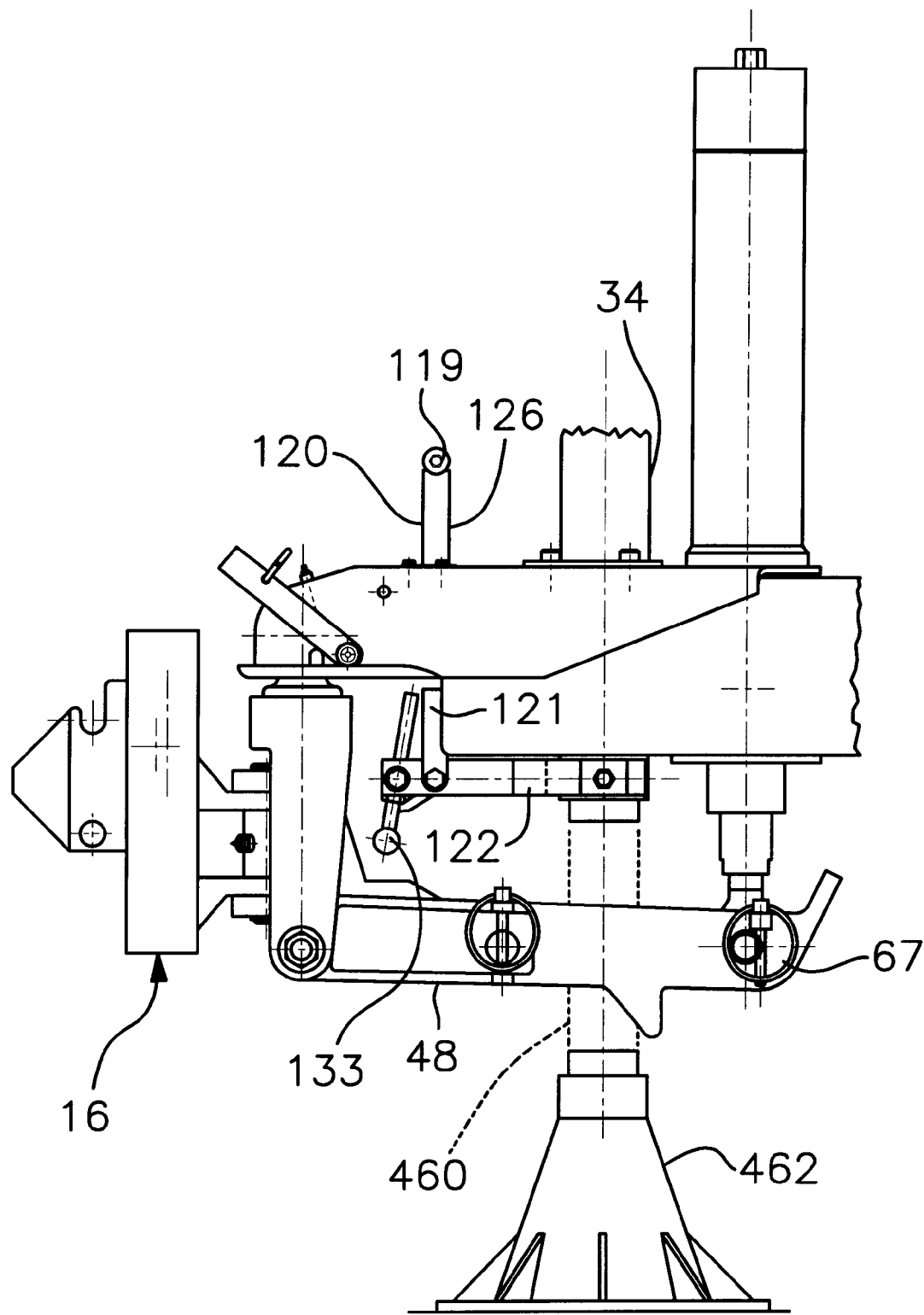
FIG. 24 is a side, elevational view similar to FIG. 23, but after the further installation of the horn angle adjustment assembly.

After the hitch head 16 is attached to coupler 36 and spring assembly 300, the angle adjustment apparatus 120 is installed in the manner shown in FIG. 24. Specifically, handle 119 is removed and the remainder of apparatus 120 is installed such that bracket 122 engages jack 34 and arm 126 extends upwardly through the previously described opening in coupler hood 36. Handle 119 is reattached to arm 126 and the arm remains in an upward position such that bearing mechanism 131 pivots downwardly in the manner shown in FIG. 24. Jack 34 is operated so that the movable jack post 460 is lowered to engage the jack support stand 462 in the manner illustrated in phantom. The temporarily supports 400 are removed and the jack is employed to the level the trailer.

Drawbar assembly 14 is interconnected to the tow vehicle receiver tube 22 in the manner previously described. The drawbar and hitch head installation should be performed on a level ground surface G. The installer should check the height of receiver tube 22 and the inside of ball coupling receiver 100. Preferably, the receiver tube should be between 10.75" and 15.75" in height, depending upon the type of tow vehicle involved. The height of the trailer ball coupling receiver 100 may vary from trailer to trailer, but should be approximately 19–20". To ensure that the trailer is level, a conventional carpenter's level may be employed. Alternatively, the height of the front and rear of the trailer may be measured. The tow vehicle is backed up so that drawbar assembly 14 is positioned proximate to hitch head assembly 16 (See FIG. 1). The installer next reviews a prepared chart to determine the proper angular adjustment for drawbar assembly 14 and the correct height adjustment for horn 80. The following chart recites preferred drawbar angular settings corresponding to particular types of tow vehicles and varying tongue weights.

CHART #1

| Trailer Tongue Weight in Pounds | STIFF (¾–1 TON) | AVERAGE ½ TON | FLEXIBLE (PASSENGER) |
|---|---|---|---|
| LIGHT 450–750 | 2–4 degrees | 4–6 | 4–6.5 |
| MEDIUM 750–1100 | 3-5 | 5–7 | 6.5–8.5 |
| HEAVY 1100–1600 | 4–6 | 6–8 | |
| MAX. TONGUE WGHT | 2000 # | 1500 # | 1000 # |

Figure 25:
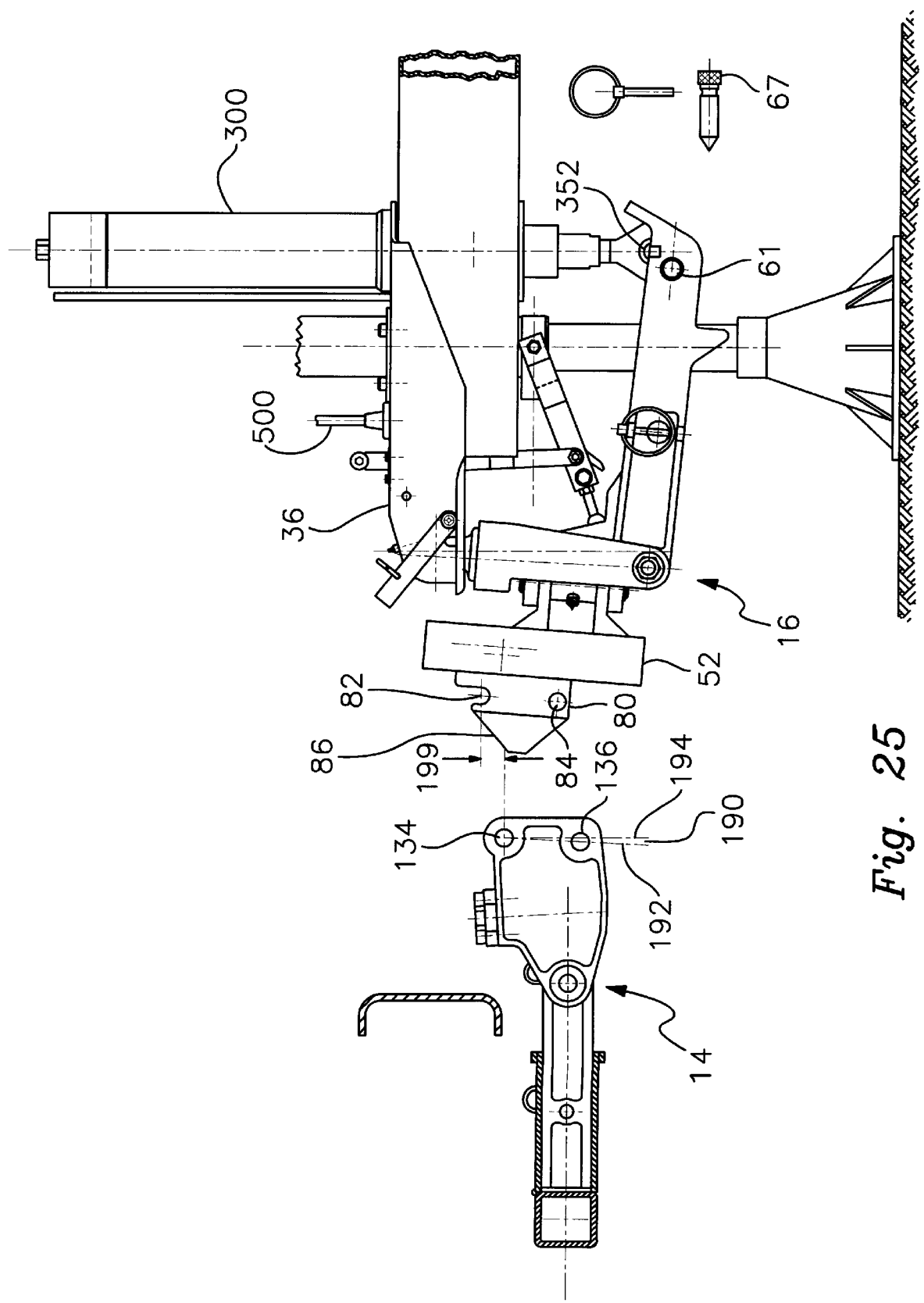
FIG. 25 is a side elevational view of the entire hitch apparatus; the drawbar assembly is positioned proximate the hitch head assembly, the angle adjuster is engaged with the drawbar extension; and the spring assembly connector link is disconnected from the drawbar extension.
Figure 26:
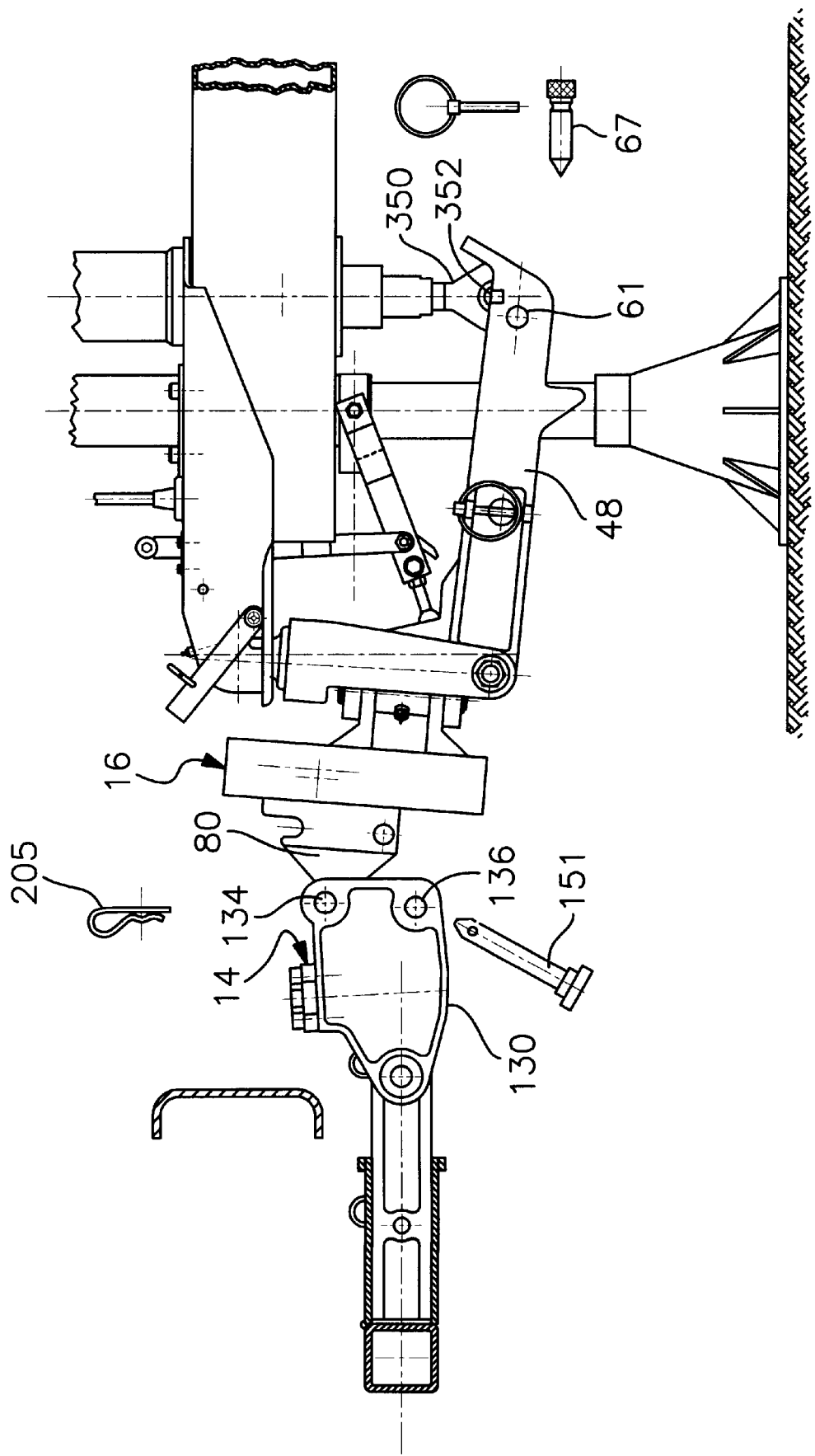
FIG. 26 is a side elevational view of the hitch apparatus as the first coupling component is engaged with the ramp of the height adjustable horn.

Specifically, component 130 is angularly set by adjusting bolt 142, in the manner previously described, to form a predetermined angle 190, FIGS. 2 and 25. This angle is the amount which component 130 is lowered relative to the longitudinal axis of bar 20. The angle is formed by the line 192 extending through the axes of pin 134 and hitch pin hole 136 and the vertical line 194 that extends through those axes before the adjustment is made. As indicated in Chart #1, only a slight adjustment (e.g. 2–4°) is required when the trailer tongue weight is very light and a stiff tow vehicle, such as a three quarter to one ton truck is employed. Conversely, when a heavy tongue weight is involved or a light passenger vehicle is employed as a tow vehicle, a much larger angle, e.g. 8.5° or more, may be required. Typically, the range of angular adjustment is between zero and ten degrees.

Hitch head 16 is likewise adjusted. In particular, horn 80 is positioned longitudinally within channel 52 in the manner previously described. This position is determined by referring to the following chart.

CHART #2

| Trailer Tongue Weight in Pounds | STIFF (¾–1 TON) | AVERAGE ½ TON | FLEXIBLE (PASSENGER) |
|---|---|---|---|
| LIGHT 450–750 | ⅞" | 1 ⅜" | 1 ⅞" |
| MEDIUM 750–1100 | 1 ⅛" | 1 ¾" | 2 ⅜" |
| HEAVY 1100–1600 | 1 ½" | 2" | |

The above height dimensions represent the height difference between the axial center of channel recess 82 and the axial center of fixed pin 134. This height difference 199 is required to compensate for the eventual torsion that is exerted on the drawbar assembly and, after coupling is completed, helps to return the component 130 to a level orientation relative to the ground. This is illustrated more clearly below. Once again, a relatively small distance is required when a large tow vehicle and a light load are involved. Alternatively, a greater spacing 199 is required for relatively flexible passenger type tow vehicles or heavier drawbar weights.

After the drawbar assembly and the hitch head horn height have been set, the hitch head 16, horn 80 and drawbar extension 48 are angularly adjusted by engaging the angular adjustment mechanism 120 with pocket 51 in the manner previously described and shown in FIGS. 9 and 24A. First, pin 67 is disengaged from aligned holes 61 and 352. This permits the tongue extension to pivot. Handle 119 is grasped and rotated approximately 10° and spring arm 126 is pushed down through trailer frame 30 (FIG. 24A). Element 133 of bearing mechanism 131 is engaged with pocket 51 of drawbar extension 43. The lever arm 135 of bearing mechanism 431 is pivoted, in the manner shown by arrow 700, until it is slightly past alignment with bracket 122 and engages stop 443 (FIGS. 9 and 25). As a result, the angular adjustment mechanism 120 is latched in place and horn 80 is held at a slightly upward angle, shown in FIG. 25. This angle is set so that the line between the axial centers of horn recess 82 and the hitch pin hole 84 is generally parallel to the line interconnecting the axial centers of pin 134 and hitch pin holes 136.

At this point, the professional installer has typically completed his or her tasks. Alternatively, it should be understood that the above steps can be performed by the trailer owner in many cases. Such steps do not involve welding or other technical procedures normally requiring professional expertise. In any event, all of the preliminary adjustments are completed and the hitch assembly 10 is ready for final coupling and adjustment.

To couple the tow vehicle and trailer, the owner drives the tow vehicle rearwardly toward the waiting trailer. A telescoping rod 500 is mounted on coupler 36 to guide the person positioning the tow vehicle. If required, jack 34 adjusts the height of the trailer such that pin 134 of component 130 engages horn 80 at a point along ramp 86 (See FIG. 26) with the axial centers about 0.75 inches apart. The tow vehicle is driven slowly in a rearward direction such that pin 134 rides up ramp 86 and drops into recess 82. At the same time, due to the aforementioned adjustments, the hitch pin holes 136 of component 130 are aligned with hitch pin hole 84 of horn 80 and pin 151 is inserted through the holes. If, in rare circumstances, the holes are slightly misaligned (due, for example, to severe unevenness of the ground), jack 34 may raise or lower the trailer, as needed, to bring the holes into alignment. Hitch pin 151 is then inserted through the aligned holes. As a result, the component 130 and drawbar assembly 14 are securely coupled to hitch head 16, drawbar extension 48 and thereby trailer 12 in the manner shown in FIG. 27. A hitch pin clip 205 is engaged through an opening in the distal end of hitch pin 151 to prevent unintended removal of the hitch pin from the aligned hitch pin holes.

Figure 27:
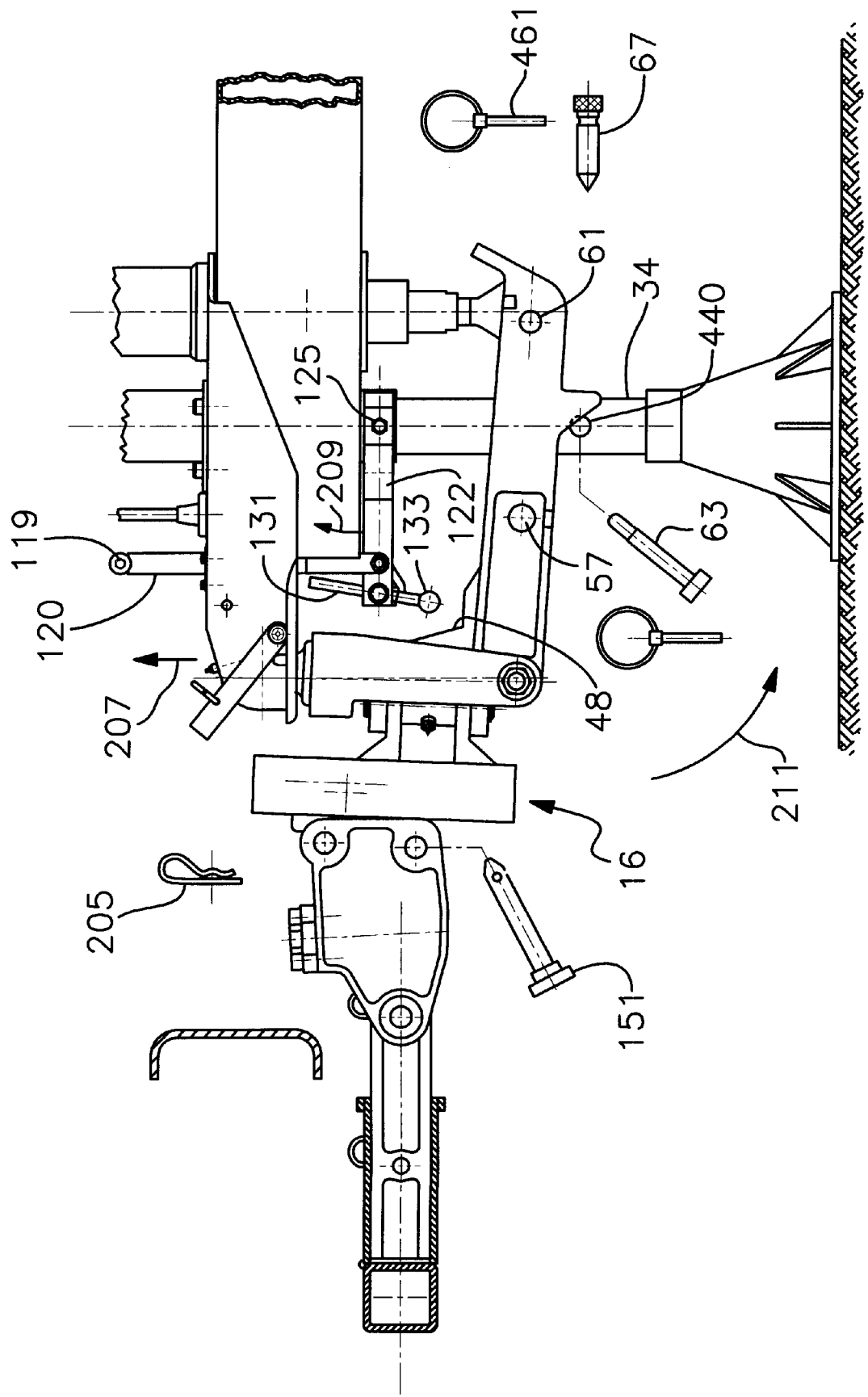
FIG. 27 is a side, elevational view of the trailer hitch after the first and sec ond coupler components have been interengaged and further illustrating the installation of a secondary pivot pin in the jack post hole to pivot the drawbar extension into proper position relative to the spring assembly.

After coupling has been completed, angular adjustment mechanism 120 is released. This is accomplished by simply pulling upwardly on handle 119 in the direction of arrow 207. The lever arm 135 of bearing mechanism 131 pivots away from stop 443 and bracket 122 rotates upwardly relative to the mounting clamp 125 in the direction of arrow 209. As shown in FIG. 27, bearing element 133 pivots downwardly and disengages pocket 51 of hitch head 16. As a result, the hitch head assembly pivots downwardly in the manner indicated by arrow 211. In some cases, before angular adjustment mechanism 120 is disengaged from hitch head assembly 16, jack 34 may have to be operated to lower the trailer slightly in order to relieve latching tension of bracket 122 and lever arm 135 on the bearing element 133. This may occur, for example, if the ground is uneven. This allows handle 119 to be pulled upwardly. When notch 127 reaches opening keyway 153, the spring arm 126 snaps back into its normally biased condition. See FIG. 16. This holds the angular adjustment mechanism 120 in its raised condition.

Figure 28:
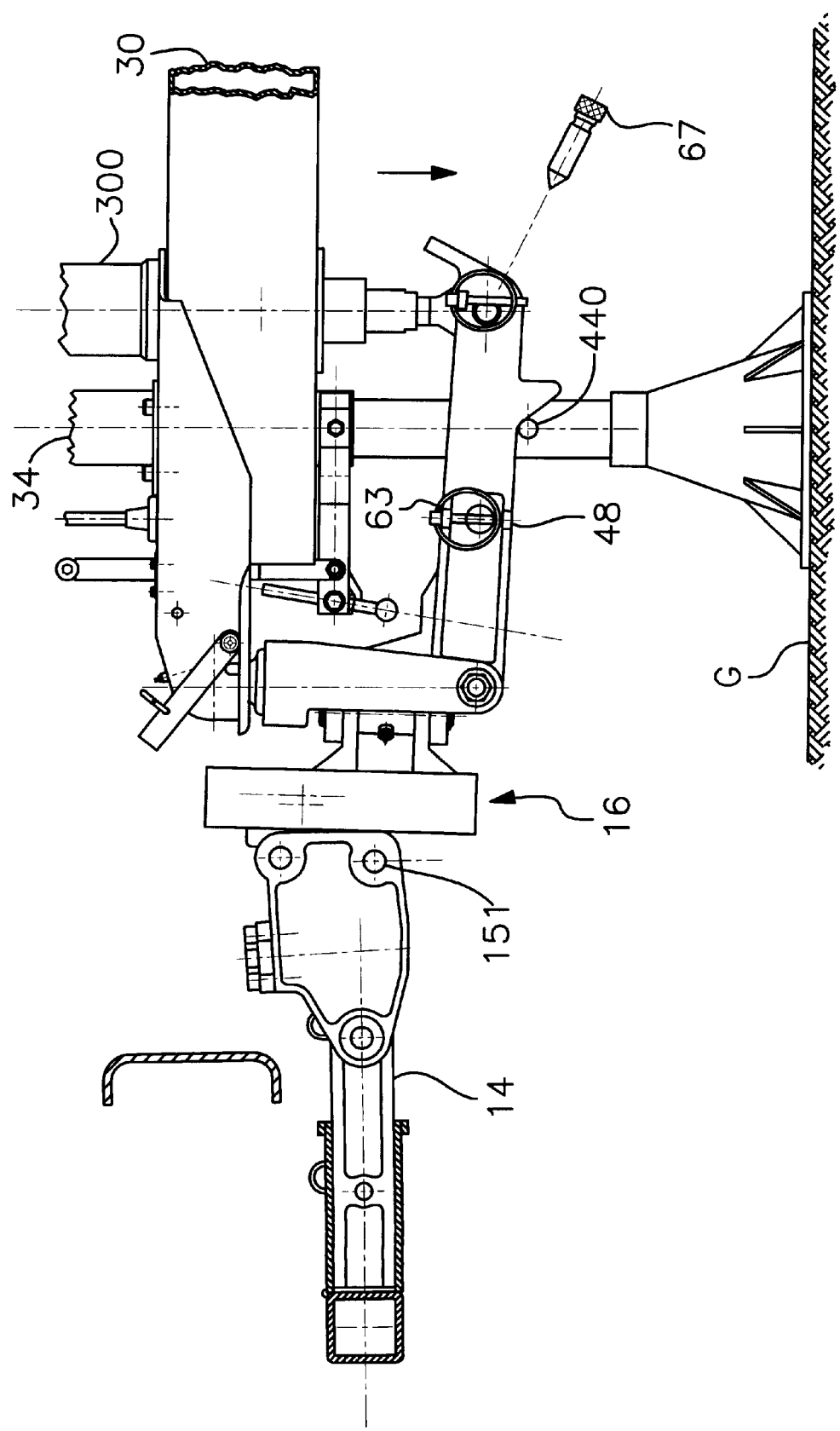
FIG. 28 is a side elevational view of the couple d hitch apparatus with t he jack in a lowered condition and the spring assembly pivot pin interengaged with the drawbar extension and the connector link.
Figure 29:
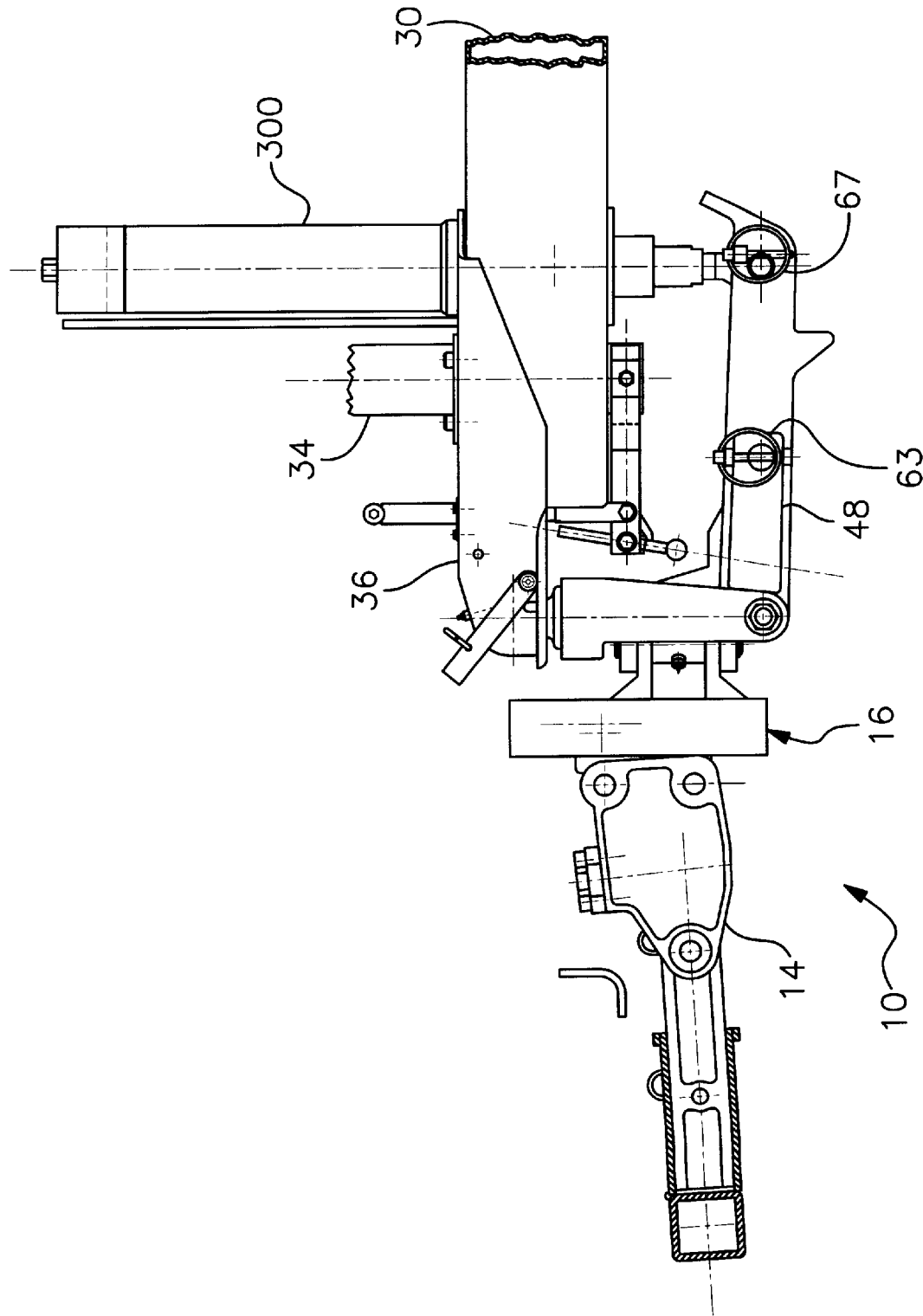
FIG. 29 is a side, elevational view of the hitch apparatus after all necessary adjustments have been made in a fully loaded condition that properly distributes the tongue weight to the axles of the tow vehicle and trailer.

With mechanism 120 disengaged, jack 34 is operated to raise the trailer approximately 3 inches. Pin 63 is removed from storage opening 57 in extension portion 53. This pin is inserted into hole 440 in the movable post of jack 34. Jack 34 then lowers trailer frame 30 in the manner shown in FIG. 28. As a result, drawbar extension is lifted by the pin 63 received in jack post hole 440 until the opening 61 in drawbar extension 48 is aligned with hole 352 in connector link 350. When these openings are aligned, pin 67, is re-inserted through the aligned openings so that the spring assembly 300 is operably interconnected to drawbar extension 48. Jack 34 is partially lowered and pin 63 is then removed from hole 440 and replaced in the storage opening, as illustrated in FIG. 28. Finally, jack 34 is fully lowered such that the load is fully supported by spring assembly 300. The jack post 460 is raised and the jack stand 462 is removed and stored. The fully assembled and coupled hitch appears as shown in FIG. 29. The tow vehicle and trailer are now ready for operation. Hitch 10 distributes the trailer tongue weight properly to the front and rear axles of the tow vehicle and to the forward and rearward axles of the trailer. A level, stable and extremely safe ride are provided.

To insure that proper weight distribution is achieved, the owner should check the levelness of the tow vehicle on level ground, both before and after the hitch apparatus is installed. This is accomplished by measuring the height of identical reference points on the vehicle (i.e. the front and rear fenders). Due to the load of the trailer tongue, the height will be less after the hitch is installed but the difference in such heights should not be greater than about 0.75 inches. Otherwise, the weight is not properly distributed. The weight does not have to be measured directly.

To subsequently disengage hitch apparatus 10, the jack is deployed downwardly until hole 440 is below drawbar extension 48. Pin 63 is re-engaged with hole 440 and the jack post is raised so that pin 63 engages extension 48 and the stress is relieved from pin 67. The jack is then utilized to further raise the trailer such that pin 67 may be easily removed from the drawbar extension and connector link. Next, the jack stand is placed under jack 34 and the jack post is engaged with the stand. The jack is raised to lift the entire assembly again such that stress is relieved from hitch pin 151. Lower hitch pin 151 is then disengaged from the coupled drawbar assembly and horn. Jack 34 lowers trailer frame 30 to disengage upper pin 134 from horn recess 82. The tow vehicle is pulled slightly forward and receiver pin 26 is disengaged so that drawbar assembly 14 can be removed from receiver tube 22. The tongue assembly can then be conveniently transported and stored as required. Alternatively, the drawbar assembly can be mounted and stored on the horn.

Following disassembly, the hitch head assembly, height adjustable horn and drawbar extension remain suspended from the ball coupler in an unloaded condition. It is unnecessary to disassemble, transport and store these heavy parts. This is a significant advantage of this invention. Installing, removing, transporting and storing the various pins utilized by the apparatus (i.e. pins 151, 63 and 67) is simple and convenient and is a significant advantage over nut and bolt connectors. The present invention eliminates the time, exertion and aggravation typically associated with disassembling or reassembling the entire hitch head each time the trailer is coupled to or uncoupled from the tow vehicle. This makes coupling a quick and simple procedure for almost all trailer owners. The initial angular and height adjustments may be performed by a trailer hitch expert. Alternatively, mechanically inclined trailer owners can also perform such adjustments relatively quickly and simply. Because a pre-loaded spring stack is employed, this totally eliminates the strenuous and often difficult job of loading conventional spring bars. In fact, after the spring stack is pre-loaded, it typically does not have to be reset each time the tow vehicle is coupled to the trailer. This significantly facilitates installation of the hitch and coupling of the tow vehicle and trailer. It should be noted that the pre-loaded spring assembly of this invention may also be used on trailer hitches that do not utilize the adjustable coupler described herein.

Figure 30:
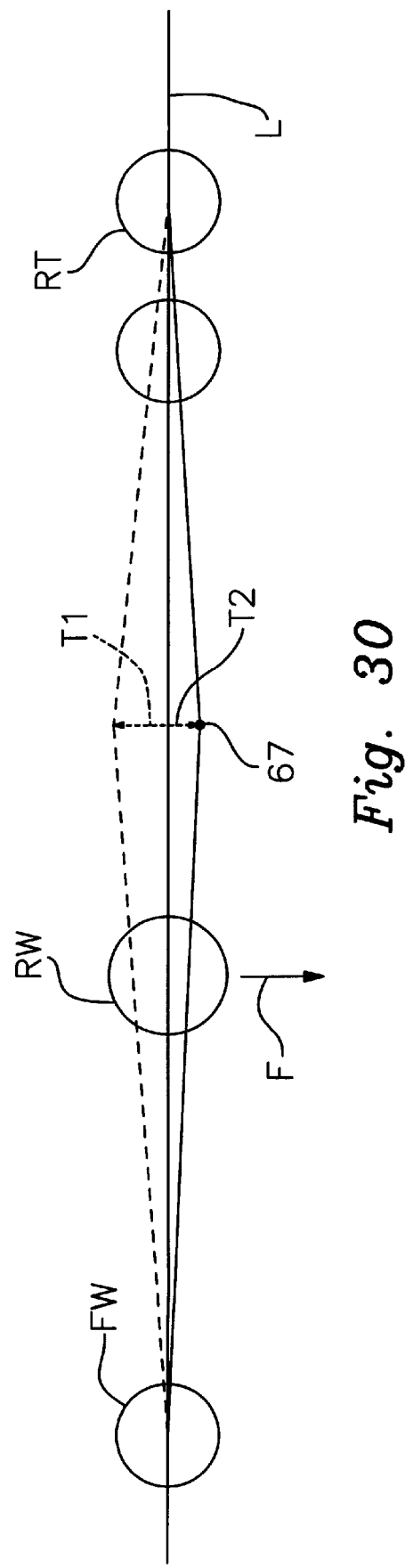
FIG. 30 is a schematic view that exhibits the downward toggle and positioning of the couple below the axis connecting the centerlines of the wheel axles in accordance with this invention.

During operation of the tow vehicle and trailer, the tongue weight is properly distributed to the axles of the tow vehicle and the trailer so that an improved, stable ride is achieved. Additionally, placement of the x-axis coupling along the axis of pin 67 further contributes to the stability of the device. As illustrated in the schematic drawing of FIG. 30, the x-axis coupling is positioned approximately two inches below the longitudinal axis L connecting the centerline of the axle of the forwardmost tow vehicle wheel FW and the axle centerline of the rearwardmost trailer wheel RT. As a result, the hitch exhibits a more stable downward toggle T2, rather than the less stable upward toggle T1 exhibited by most known hitches. When the tow vehicle brakes, this downward toggle produces a downward force F that urges the rear wheels RW of the tow vehicle into secure, gripping interengagement with the road surface. Lifting of the rear tow vehicle wheels and resulting instability are thereby avoided, particularly when sudden stops are required. A significant reduction of tongue weight is also achieved. That weight is reduced from approximately 15% to at least as low as 7.5%, and possibly even less of the load weight. The excess weight remains on the axles of the trailer rather than overloading and overstressing the tow vehicle. This further enhances stability. Unlike prior hitches, the x-axis coupling represented by pin 67 is spaced apart and distinct from the z-axis coupling (pin 200) and the x and z axes do not intersect. These axes are separated sufficiently such that the tow vehicle can rotate freely relative to the trailer about the z-axis. This permits the rig to properly negotiate turns. Also, separating the x and z axes restricts rotation about the z-axis (pin 200) when a sudden bump or dip is encountered. This improves stability somewhat.

A significant advantage of this invention is the improved dampening and bounce control that is achieved by the use of pre-loaded, dual action spring assembly 300. The dual acting disc springs resiliently cushion not only downward motion but also upward motion of the front end of the trailer. Unlike conventional spring bars, the spring stack does not unload when encountering a bump or dip in the roadway. Rather, the disc springs resist and cushion the upward bounce and provide for a much more stable and safe ride. Sway control device 71 further contributes to bounce control. Because the sway control device is pivoted in the y-axis several inches below the dampening arm of the sway control, it also resists bounce and prevents an upward thrust of the tow vehicle at the ball during a braking operation.

Drawbar assembly 14 and hitch assembly 16 are composed of durable metals and metal alloys similar to those which are conventionally used in the trailer hitch industry. Various known manufacturing techniques may be employed to construct these components. The only component which must be removed and installed each time the hitch is assembled is the drawbar assembly. This assembly can be fairly lightweight (e.g. less than 10 lbs.) and is easy for most persons to carry and install. Because the bearing components of the hitch, which permit turning, are not disassembled each time the apparatus is unhitched, the apparatus cam be greased by using a grease gun and standard fittings.

Accordingly, the adjustable hitch of this invention is not only easy to install and remove, it is also fully adjustable. It eliminates the need for a permanent weld between the drawbar and the hitch head. It also eliminates the need to break and reform that weld when a different tow vehicle is required or an erroneous connection is initially made. The hitch head may be readily interchanged between various tow vehicles and trailers and it may be adjusted or readjusted, as required, in a quick and convenient manner.

It will thus be seen that the objects made apparent from the preceding description are sufficiently obtained and certain changes may be made in the above construction without departing from the scope of the invention. It is intended that all matter contained in the above description and shown in the accompanying drawings be interpreted as illustrative and not in an imitative sense. Although specific features of the invention are shown in some drawings and not others, this is for convenience only as each feature may be combined with any or all of the features in accordance with the invention. Other embodiments, within the scope of this invention, will occur to those skilled in the art.

What is claimed is:

1. An adjustable, weight distributing hitch for innerconnecting a trailer to a tow vehicle, said hitch comprising:

a drawbar assembly including a bar that is selectively attachable to the tow vehicle and a first coupling component interconnected to said bar;

a hitch head that is releasably attachable to and suspendable from the trailer, said hitch head including a ball element that is releasably and pivotally engagable with a standard ball coupler mounted on the trailer, said hitch head further including a a drawbar assembly including a bar that is selectively attachable to the tow vehicle and a first coupling component interconnected to said bar;

a hitch head that is releasably attachable to and suspendable from the trailer, said drawbar assembly and said hitch head including complementary coupling components that are interengagable to couple said drawbar and said hitch head together;

a drawbar extension that is connectable to said hitch head such that said clevis attached to and depending from said ball element, said drawbar assembly and said hitch head including complementary coupling components that are interengagable to couple said drawbar and said hitch head together;

a drawbar extension that is connectable to said hitch head such that said drawbar extension extends rearwardly therefrom relative to the trailer, said drawbar extension being connected to and extending rearwardly from said clevis;

an X-axis coupling carried by said drawbar extension proximate a distal end thereof;

a first connector attachable to the trailer;

a second connector attached to said X-axis coupling; and dual action spring means, interconnecting said first and second connectors, for dampening movement of said X-axis coupling both upwardly and downwardly relative to the trailer.

2. The device of claim 1 in which said spring means includes a stack of generally juxtaposed disc spring elements arranged in an alternating pattern, each spring being biased in a direction opposite to that of each immediately adjacent spring.

3. The device of claim 2 in which each disc spring element has an annular shape, and wherein said spring means further include an elongate central element about which said spring elements are disposed and a housing that contains said spring elements.

4. The device of claim 3 further including annular spacer elements disposed about said central element and between each pair of adjacent spring elements.

5. The device of claim 3 in which said housing is connected to one of said trailer and said couple by one of said connectors and said other connector includes a depending connector link that is slidably mounted within said housing and resiliently engages said spring elements, said connector link being pivotally connected to the other of said trailer and said couple.

6. The device of claim 2 in which said spring means include means for compressing said stack of spring elements in response to each of upward movement and downward movement of said couple relative to said trailer.

7. The apparatus of claim 1 further including a jack mechanism mounted to said trailer, said mechanism having a generally vertical post that is selectively extended and retracted to engage and disengage the ground, respectively, said post being further extended when it engages the ground to raise the trailer and subsequently retracted to lower the trailer relative to the ground.

8. The apparatus of claim 7 in which said second connector and said rearward portion of said hitch include complementary coupling holes, said jack post including means for selectively carrying a support element; said support element being engagable by said rearward portion of said hitch when said trailer is lowered to lift said tongue extension such that said coupling holes are aligned, said couple including an insertion element that is received by said aligned coupling holes to couple said dampening assembly and said rearward hitch portion.

9. The apparatus of claim 1 in which said drawbar extension is attached by a pivot device to said clevis.

10. The apparatus of claim 1 in which one of said coupling components includes a hitch pin that extends transversely to a longitudinal axis of the trailer, the other said coupling component including a ramp having a recess formed proximate an upper end of said ramp, said hitch pin and said ramp being supported at relative heights such that directing the tow vehicle toward the trailer causes said hitch pin to interengage said ramp and travel along said ramp and drop into said recess to couple said coupling components and interconnect the trailer and the tow vehicle.

11. The apparatus of claim 1 further including cam means carried by the trailer and being alternatable between a first position, wherein said ball element is permitted to be introduced into and removed from said ball coupler and a second position wherein said ball element is lockable and suspendable from the ball coupler.

12. The apparatus of claim 11 in which said cam means are attached to and alternated by a lever pivotably attached to the trailer, said lever being selectively pivoted to alternate said cam means between said first and second positions.

13. The apparatus of claim 1 further including a Z-axis coupling that is defined by said ball element, said Z-axis coupling being spaced apart and distinct from X-axis coupling.

14. The apparatus of claim 1 in which said X-axis coupling is remote from said ball element.

15. The apparatus of claim 1 further including means connected to the trailer for urging said hitch head to pivot about said ball element and angularly adjusting said hitch head relative to the trailer.

16. An adjustable, weight distributing hitch for innerconnecting a trailer to a tow vehicle, said hitch comprising:

a drawbar assembly including a bar that is selectively attachable to the tow vehicle and a first coupling component interconnected to said bar;

a hitch head that is releasably attachable to and suspendable from the trailer, said drawbar assembly and said hitch head including complementary coupling components that are interengagable to couple said drawbar and said hitch head together;

a drawbar extension that is connectable to said hitch head such that said drawbar extension extends rearwardly therefrom relative to the trailer;

an X-axis coupling carried by said drawbar extension proximate a distal end thereof;

a first connector attachable to the trailer;

a second connector attached to said X-axis coupling; and dual action spring means, interconnecting said first and second connectors, for dampening movement of said X-axis coupling both upwardly and downwardly relative to the trailer, one of said coupling components including a hitch pin that extends transversely to a longitudinal axis of the trailer, the other said coupling component including a ramp having a recess formed proximate an upper end of said ramp, said hitch pin and said ramp being supported at relative heights such that directing the tow vehicle toward the trailer causes said hitch pin to interengage said ramp and travel along said ramp and drop into said recess to couple said coupling components and interconnect the trailer and the tow vehicle.

* * * * *

UNITED STATES PATENT AND TRADEMARK OFFICE
CERTIFICATE OF CORRECTION

PATENT NO. : 6,142,500
DATED : November 7, 2000
INVENTOR(S) : Sargent, Frank T.

It is certified that error appears in the above-identified patent and that said Letters Patent is hereby corrected as shown below:

<u>Column 18, claim 1,</u>
Lines 11-21, delete all of the wording from "a drawbar assembly" through "such that said".

Signed and Sealed this

Twentieth Day of November, 2001

*Attest:*

Nicholas P. Godici

NICHOLAS P. GODICI
*Attesting Officer*   *Acting Director of the United States Patent and Trademark Office*